US012334738B2

(12) United States Patent
Hario et al.

(10) Patent No.: US 12,334,738 B2
(45) Date of Patent: Jun. 17, 2025

(54) POWER CONVERSION DEVICE AND ESTIMATION DEVICE

(71) Applicant: Mitsubishi Electric Corporation, Tokyo (JP)

(72) Inventors: Masahiro Hario, Tokyo (JP); Noriyuki Imada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 18/252,235

(22) PCT Filed: Nov. 17, 2020

(86) PCT No.: PCT/JP2020/042828
§ 371 (c)(1),
(2) Date: May 9, 2023

(87) PCT Pub. No.: WO2022/107214
PCT Pub. Date: May 27, 2022

(65) Prior Publication Data
US 2024/0014661 A1 Jan. 11, 2024

(51) Int. Cl.
*H02J 3/36* (2006.01)
*H02J 3/01* (2006.01)
*H02J 3/24* (2006.01)
*H02J 3/18* (2006.01)
*H02J 3/38* (2006.01)
*H02M 7/68* (2006.01)

(52) U.S. Cl.
CPC .................... *H02J 3/36* (2013.01); *H02J 3/24* (2013.01); *H02J 3/01* (2013.01); *H02J 3/18* (2013.01);
(Continued)

(58) Field of Classification Search
CPC ........ H02J 3/01; H02J 3/18; H02J 3/24; H02J 3/36; H02J 2003/365; H02J 5/00; H02M 1/12; H02M 7/68; H02M 7/4835
See application file for complete search history.

(56) References Cited

U.S. PATENT DOCUMENTS 10,461,538 B2 * 10/2019 Yamazaki ......... H02J 13/00034
2008/0177425 A1 * 7/2008 Korba .................. H02J 3/1814
700/297
(Continued)

FOREIGN PATENT DOCUMENTS

JP 2002238261 A 8/2002
JP 2003339119 A 11/2003
(Continued)

OTHER PUBLICATIONS

International Search Report (PCT/ISA/210) with translation and Written Opinion (PCT/ISA/237) mailed on Jan. 19, 2021 by the Japanese Patent Office as the International Searching Authority for International Application No. PCT/JP2020/042828. (11 pages).

(Continued)

*Primary Examiner* — Fred E Finch, III
(74) *Attorney, Agent, or Firm* — Buchanan Ingersoll & Rooney PC

(57) ABSTRACT

A power conversion device included in a self-excited DC power transmission system connected to an AC system includes a self-excited converter and a control device. The control device includes: a storage to store first vibration information and a first control parameter of the self-excited converter in association with each other for each of a plurality of pieces of first vibration information, a vibration detector to detect a vibration component of an AC voltage of the AC system; a determination unit to determine whether first similar vibration information similar to first detected vibration information including the vibration component of the AC voltage of the detected AC system exists in the plurality of pieces of first vibration information; and a setting unit to set the first control parameter associated with the first similar vibration information as a new control (Continued)

parameter of the self-excited converter when the first similar vibration information exists.

16 Claims, 13 Drawing Sheets

(52) U.S. Cl.
CPC ........... *H02J 2003/365* (2013.01); *H02J 3/38* (2013.01); *H02M 7/68* (2013.01)

(56) References Cited

U.S. PATENT DOCUMENTS

2016/0276829 A1* 9/2016 Haederli ................. H02M 7/44
2018/0269775 A1* 9/2018 Sadilek .................... H02J 3/01
2020/0381920 A1* 12/2020 Runge ...................... H02J 3/18
2021/0103365 A1* 4/2021 Saito ....................... G09B 9/00

FOREIGN PATENT DOCUMENTS

JP 2014042395 A 3/2014
JP 2018011405 A 1/2018

OTHER PUBLICATIONS

Extended European Search Report dated Jan. 2, 2024, issued in the corresponding European Patent Application No. 20962378.4, 10 pages.

* cited by examiner

FIG.8

| No. | OPERATION PATTERN | VIBRATION COMPONENT | | | | CONTROL PARAMETER | | |
|---|---|---|---|---|---|---|---|---|
| | | 1f | 2f | 3f | ... | K | T | ... |
| 1 | TWO-POWER TRANSMISSION LINE OPERATION | 99.0% | 0.5% | 0.1% | ... | 20 | 0.5 | ... |
| 2 | ONE-A-POWER TRANSMISSION LINE OPERATION | 95.0% | 2.0% | 1.1% | ... | 10 | 0.5 | ... |
| 3 | ONE-A-POWER TRANSMISSION LINE OPERATION | 92.0% | 2.0% | 2.0% | ... | 6 | 0.5 | ... |
| 4 | ONE-B-POWER TRANSMISSION LINE OPERATION | 90.0% | 3.0% | 0.1% | ... | 5 | 0.5 | ... |
| 5 | TURN OFF C ROUTE | 94.0% | 1.0% | 1.0% | ... | 2 | 0.5 | ... |
| ⋮ | ⋮ | ⋮ | ⋮ | ⋮ | ⋮ | ⋮ | ⋮ | ⋮ |

500

POWER CONVERSION DEVICE AND ESTIMATION DEVICE

TECHNICAL FIELD

The present disclosure relates to a power conversion device and an estimation device.

BACKGROUND ART

A separately-excited converter in which a thyristor is used as a switching element and a self-excited converter in which an element that can be turned on and off at arbitrary timing such as an insulated gate bipolar transistor (IGBT) as the switching element exist as a converter applied to a DC power transmission system. In recent years, there has been an increase in demand for the self-excited converter as compared to the separately-excited converter. For example, when a power flow between a certain AC system and another AC system is enhanced, an existing power conversion system in which the separately-excited converter is used is sometimes added to a power conversion system in which the self-excited converter is used.

Japanese Patent Laying-Open No. 2014-42395 A (PTL 1) discloses a control device for an AC-DC converter. When an interchanged power command value for the entire DC power transmission system increases, the control device gives the interchanged power command value for the self-excited DC power transmission system to a delay circuit to increase the interchanged power command value for the separately-excited DC power transmission system at timing earlier than the interchanged power command value for the self-excited DC power transmission system, and after an interchanged power increase of the separately-excited DC power transmission system is completed, the control device increases the interchanged power command value for the self-excited DC power transmission system.

CITATION LIST

Patent Literature

PTL 1: Japanese Patent Laying-Open No. 2014-42395

SUMMARY OF INVENTION

Technical Problem

In a system in which the self-excited converter and separately-excited converter are connected to the same AC system, when any change (for example, a change in short-circuit capacity of the AC system) is generated during operation, vibration (for example, vibration of AC voltage) is sometimes generated in the AC system due to an influence of control responsiveness. In this case, while the separately-excited converter performs control in order to prevent the vibration, the self-excited converter also performs control in order to prevent the vibration, so that there is a possibility that hunting of the control is generated to generate regularly the vibration.

An object of one aspect of the present disclosure is to provide a technique capable of preventing the vibration of the AC system by appropriately setting a control parameter of the self-excited converter when the self-excited converter and the separately-excited converter are connected to the AC system.

Solution to Problem

A power conversion device included in a self-excited DC power transmission system connected to an AC system is provided according to one embodiment. The power conversion device includes a self-excited converter to perform power conversion between the AC system and a DC system, and a control device to control operation of the self-excited converter. The control device includes a storage that stores a first vibration information and a first control parameter of the self-excited converter in association with each other for each of a plurality of pieces of first vibration information. The first vibration information includes a first vibration component included in the AC voltage of the AC system. The first control parameter associated with the first vibration information is a parameter preventing the first vibration component. The control device further includes: a vibration detector to detect a vibration component of an AC voltage of the AC system; a determination unit to determine whether first similar vibration information similar to first detected vibration information including the vibration component of the AC voltage of the detected AC system exists in the plurality of pieces of first vibration information stored in the storage; and a setting unit to set the first control parameter associated with the first similar vibration information as a new control parameter of the self-excited converter when the first similar vibration information exists.

An estimation device estimating a control parameter of a self-excited converter included in a self-excited DC power transmission system connected to an AC system is provided according to another embodiment. The estimation device includes: an information acquisition unit to acquire vibration information including a vibration component included in an AC voltage of the AC system; and an estimation unit to estimate, from the vibration information, the control parameter of the self-excited converter by inputting the vibration information acquired by the information acquisition unit to a learned model estimating the control parameter of the self-excited converter preventing the vibration component.

Advantageous Effects of Invention

According to the present disclosure, when the self-excited converter and the separately-excited converter are connected to the AC system, the vibration of the AC system can be prevented by appropriately setting the control parameter of the self-excited converter.

BRIEF DESCRIPTION OF DRAWINGS

FIG. 8 is a view illustrating an information table.

DESCRIPTION OF EMBODIMENTS

Figure 1:
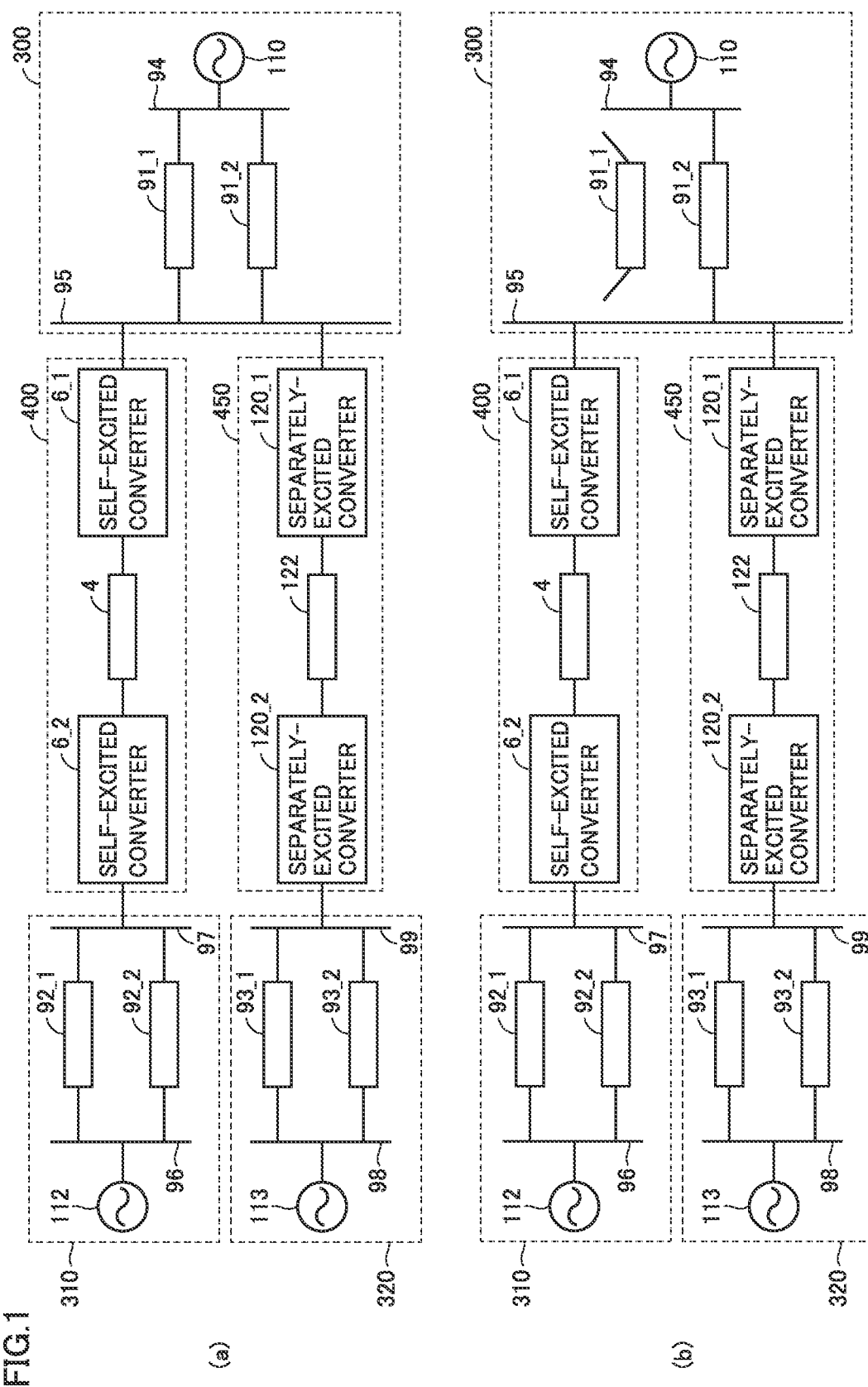
FIG. 1 is a schematic configuration diagram illustrating a power conversion system.

With reference to the drawings, embodiments of the present disclosure will be described below. In the following description, the same component is denoted by the same reference numeral. Those names and functions are the same. Accordingly, the detailed description thereof will not be repeated.

First Embodiment

<Schematic Configuration of System>

FIG. 1 is a schematic configuration diagram illustrating a power conversion system. The power conversion system includes a self-excited DC power transmission system 400 configured of a self-excited converter and a separately-excited DC power transmission system 450 configured of a separately-excited converter. FIG. 1(a) illustrates an example in which an AC system 300 connected to self-excited DC power transmission system 400 and separately-excited DC power transmission system 450 is operated by two power transmission lines. FIG. 1(b) illustrates an example in which AC system 300 is operated by one power transmission line.

With reference to FIG. 1(a), the power conversion system includes AC systems 300, 310, 320, self-excited DC power transmission system 400, and separately-excited DC power transmission system 450. Self-excited DC power transmission system 400 and separately-excited DC power transmission system 450 are connected to common AC system 300. Furthermore, self-excited DC power transmission system 400 is further connected to an AC system 310, and separately-excited DC power transmission system 450 is further connected to an AC system 320.

AC system 300 includes AC power transmission lines 91_1, 91_2, bus-lines 94, and a generator 110. AC system 310 includes AC power transmission lines 92_1, 92_2, bus-lines 96, 97, and a generator 112. AC system 320 includes AC power transmission lines 93_1, 93_2, bus-lines 98, 99, and a generator 113.

Self-excited DC power transmission system 400 includes self-excited converters 6_1, 6_2 and a DC system 4. Separately-excited DC power transmission system 450 includes separately-excited DC converters 120_1, 120_2 and a DC system 122. For example, DC systems 4, 122 are a DC power transmission line having a bipolar configuration.

In AC system 300, AC power transmission lines 91_1, 91_2 are connected between bus-line 94 and bus-line 95. Generator 110 is connected to bus-line 94, and self-excited converter 6_1 and separately-excited converter 120_1 are connected to bus-line 95. In AC system 310, AC power transmission lines 92_1, 92_2 are connected between bus-line 96 and bus-line 97. Generator 112 is connected to bus-line 96, and self-excited converter 6_2 is connected to bus-line 97. In AC system 320, AC power transmission lines 93_1, 93_2 are connected between bus-line 98 and bus-line 99. Generator 113 is connected to bus-line 98, and separately-excited converter 120_2 is connected to bus-line 99.

Self-excited converter 6_1 is a self-excited power converter that performs power conversion between AC system 300 and DC system 4. Self-excited converter 6_2 is a self-excited power converter that performs power conversion between AC system 310 and DC system 4. Each of self-excited converters 6_1, 6_2 (hereinafter, also collectively referred to as a "self-excited converter 6") is configured by an MMC conversion power converter including a plurality of converter cells connected in series with each other. However, self-excited converter 6 may be a conversion method other than the MMC conversion system. The "converter cell" is also referred to as a "sub-module" or a "unit converter".

Separately-excited power converter 120_1 is a separately-excited power converter that performs the power conversion between AC system 300 and DC system 122. Separately-excited power converter 120_2 is a separately-excited power converter that performs the power conversion between AC system 320 and DC system 122.

In the first embodiment, the power is transmitted from AC system 310 to AC system 300, self-excited converter 6_2 operates as a rectifier (REC), and self-excited converter 6_1 operates as an inverter (INV). Specifically, AC power is converted into DC power by self-excited converter 6_2 at a power transmission end, and the converted DC power is subjected to DC power transmission through DC system 4. At a power reception end, the DC power is converted into the AC power by self-excited converter 6_1 and supplied to AC system 300. In addition, the power is transmitted from AC system 320 to AC system 300, separately-excited converter 120_2 operates as the rectifier, and separately-excited converter 120_1 operates as the inverter.

In the example of FIG. 1(a), two AC power transmission lines 91_1, 91_2 are connected between bus-line 94 and bus-line 95, and AC system 300 is operated by two power transmission lines. On the other hand, in the example of FIG. 1(b), AC power transmission line 91_1 is separated from bus-bars 94, 95, and AC system 300 is operated by one power transmission line.

Figure 2:
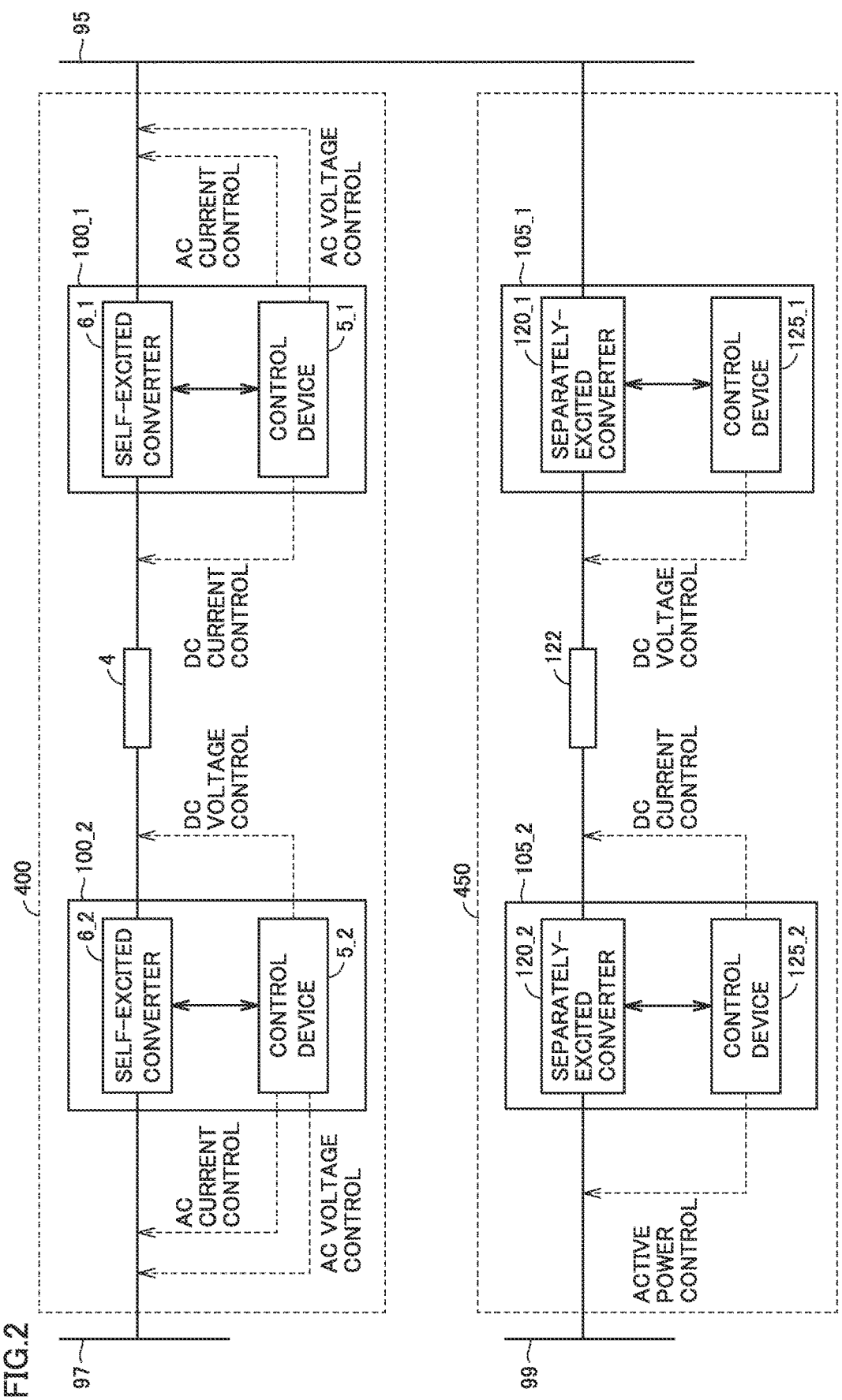
FIG. 2 is a view illustrating an example of a control system of each power conversion device.

FIG. 2 is a view illustrating an example of a control system of each power conversion device. With reference to FIG. 2, self-excited DC power transmission system 400 includes power conversion devices 100_1, 100_2. Power conversion device 100_1 includes self-excited converter 6_1 and a control device 5_1 that controls operation of self-excited converter 6_1. Power conversion device 100_2 includes self-excited converter 6_2 and a control device 5_2 that controls operation of self-excited converter 6_2. Hereinafter, the power conversion devices 100_1, 100_2 are also collectively referred to as a power conversion device 100.

Separately-excited DC power transmission system 450 includes power conversion devices 105_1, 105_2. Power conversion device 105_1 includes separately-excited converter 120_1 and a control device 125_1 that controls the operation of separately-excited converter 120_1. Power conversion device 105_2 includes separately-excited converter 120_2 and a control device 125_2 that controls the operation of separately-excited converter 120_2. Hereinafter, power conversion devices 105_1, 105_2 are also collectively referred to as a power conversion device 105.

As described with reference to FIG. 1, self-separately-excited converter 6_2 and separately-excited converter 120_2 operate as the rectifier, and self-separately-excited converter 6_1 and separately-excited converter 120_1 operate as the inverter. In this case, the following control is performed.

Self-excited converter 6_1 is operated by DC current control, whereby control device 5_1 controls the DC voltage on the power reception side of DC system 4. In addition, self-excited converter 6_1 is operated by AC current control and AC voltage control, whereby control device 5_1 controls the AC voltage of bus-line 95 of AC system 300. The AC voltage control contributes largely to the control of the AC voltage of bus-line 95 compared with the AC current control. Self-excited converter 6_2 is operated by the DC voltage control, whereby control device 5_2 controls the DC voltage on the power transmission side of DC system 4. In addition, self-excited converter 6_2 is operated by the AC current control and the AC voltage control, whereby control device 5_2 controls the AC voltage of bus-line 97 of AC system 310.

Separately-excited converter 120_1 is operated by the DC voltage control, whereby control device 125_1 controls the DC voltage on the power reception side of DC system 122. Separately-excited converter 120_2 is operated by the DC current control, whereby control device 125_2 controls the DC voltage on the power transmission side of DC system 4. Control device 125_2 controls active power output from separately-excited converter 120_2.

At this point, it is assumed that AC system 300 is switched from two-line operation to one-line operation (for example, when the state is switched from the state in FIG. 1(*a*) to the state in FIG. 1(*b*)) when self-excited converter 6_1 controls the AC voltage of bus-line 95. When the two-line operation is switched to the one-line operation, short-circuit capacity of AC system 300 changes, and impedance between generator 110 and self-excited converter 6_1 and impedance between generator 110 and separately-excited converter 120_1 increase. In this case, the AC voltage of bus-line 95 vibrates due to the influence of the control responsiveness.

When the vibration is generated in the AC voltage of bus-line 95, in self-excited DC power transmission system 400, the control (for example, the control of maintaining the AC voltage constant) in which the vibration is prevented is performed mainly by the AC voltage control of self-excited converter 6_1 connected to bus-line 95.

In addition, the vibration of the AC voltage of bus-line 95 also affects separately-excited DC power transmission system 450. Specifically, when the AC voltage is converted into the DC voltage by separately-excited converter 120_1, the DC voltage value depends on the AC voltage value. For this reason, when the vibration is generated in the AC voltage of bus-line 95, the influence of the vibration appears in the DC voltage of DC system 122. In general, because the DC current control is faster in control response than the DC voltage control, the vibration is prevented mainly by the DC current control of separately-excited converter 120_2 in separately-excited DC power transmission system 450.

As described above, when the vibration is generated in the AC voltage of bus-line 95, the control of preventing the vibration is performed by the AC voltage control of self-excited converter 6_1 on the side of self-excited DC power transmission system 400 while the control of preventing the vibration by the DC current control of separately-excited converter 120_2 on the side of separately-excited DC power transmission system 450. Accordingly, there is a possibility that the hunting of the control is generated to generate regularly the vibration.

Such regular vibration can be prevented by adjusting a control parameter of the self-excited converter or the separately-excited converter. However, in recent years, there are many cases where the self-excited DC power transmission system is introduced into a place where the existing separately-excited DC power transmission system is installed, and the change in the control parameter of the separately-excited converter affects a control response in response to an accident of the separately-excited converter. Accordingly, in the first embodiment, the vibration of the AC voltage of bus-line 95 is prevented by appropriately setting the control parameter of self-excited converter 6_1. Details of the control parameter setting system will be described later.

<Schematic Configuration of Power Conversion Device>

Figure 3:
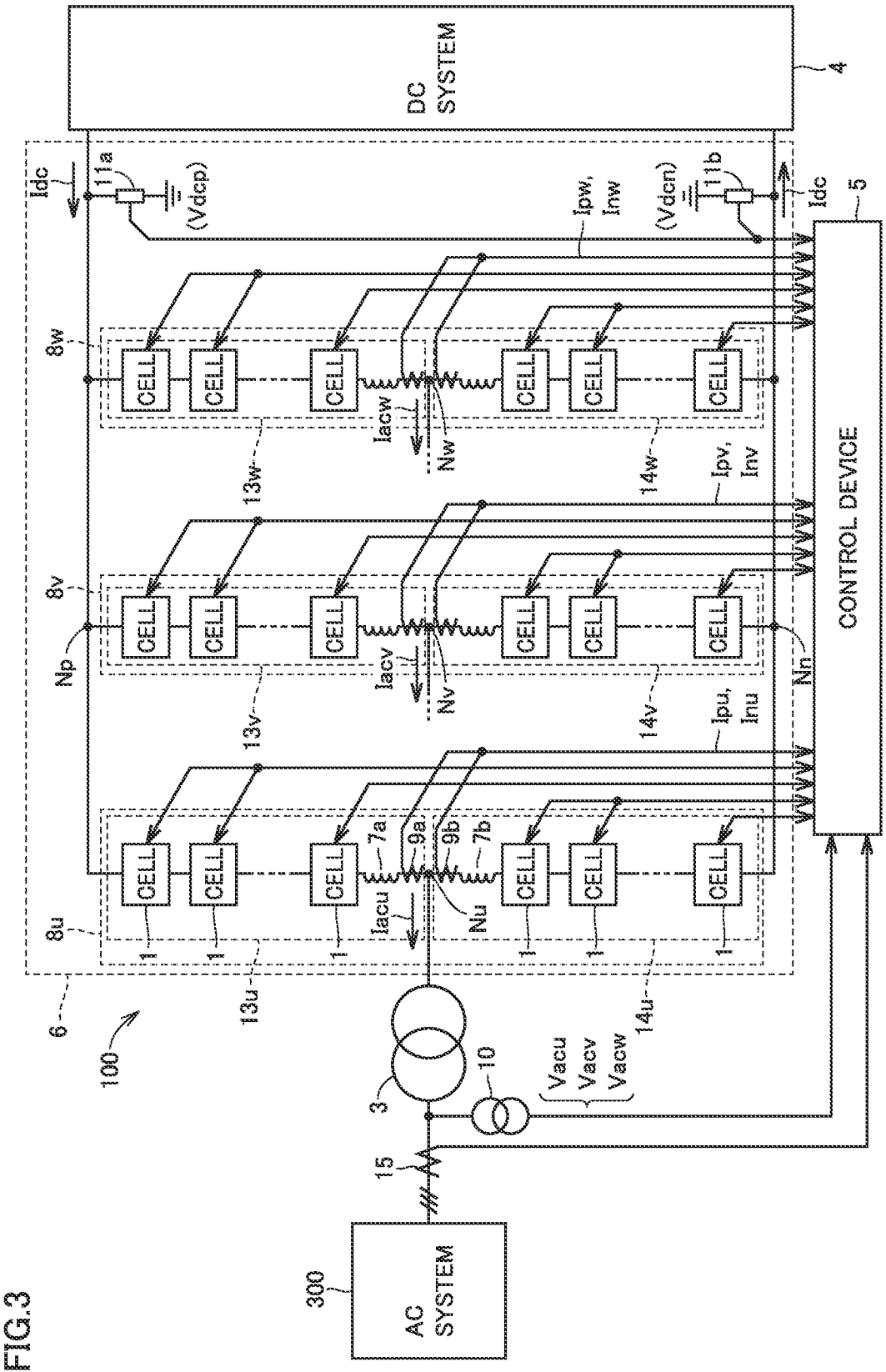
FIG. 3 is a schematic configuration diagram illustrating the power conversion device.

FIG. 3 is a schematic configuration diagram illustrating power conversion device 100. For example, power conversion device 100 in FIG. 3 is power conversion device 100_1 in FIG. 2. The configuration of power conversion device 100_2 is similar to the configuration of power conversion device 100_1.

With reference to FIG. 3, power conversion device 100 (for example, power conversion device 100_1) includes self-excited converter 6 (for example, self-excited converter 6_1) that performs the power conversion between AC system 300 and DC system 4 and control device 5 (for example, control device 5_1). Self-excited converter 6 includes a plurality of leg circuits 8*u*, 8*v*, 8*w* (hereinafter, leg circuits 8*u*, 8*v*, 8*w* are collectively referred to or an arbitrary leg circuit is referred to as a "leg circuits 8") connected in parallel to each other between a positive-side DC terminal (that is, a high potential-side DC terminal) Np and a negative-side DC terminal (that is, a low potential-side DC terminal) Nn. Control device 5 controls the switching operation of the switching elements included in these leg circuits 8.

Leg circuit 8 is provided for each phase of multi-phase AC, is connected between AC system 300 and DC system 4, and performs the power conversion between both circuits. FIG. 3 illustrates the case where AC system 300 is a three-phase AC, and three leg circuits 8*u*, 8*v*, 8*w* are provided corresponding to a u-phase, a v-phase, and a w-phase. When AC system 300 is a single-phase AC, two leg circuits are provided.

AC terminals Nu, Nv, Nw provided in leg circuits 8*u*, 8*v*, 8*w* are connected to AC system 300 with transformer 3 interposed therebetween. In FIG. 3, connection between AC terminals Nv, Nw and transformer 3 is not illustrated for ease of illustration. A DC terminal (that is, positive-side DC terminal Np and negative-side DC terminal Nn) commonly provided in each leg circuit 8 is connected to DC system 4.

Instead of using transformer 3 in FIG. 3, leg circuits 8*u*, 8*v*, 8*w* may be connected to AC system 300 with an interconnection reactor interposed therebetween. A primary winding may be provided in each of leg circuits 8*u*, 8*v*, 8*w* instead of AC terminals Nu, Nv, Nw, and leg circuits 8*u*, 8*v*, 8*w* may be connected to transformer 3 or the interconnection reactor in terms of AC through a secondary winding magnetically coupled to the primary winding. In this case, the primary winding may be set to following reactors 7*a*, 7*b*. That is, leg circuit 8 is electrically (that is, in terms of DC or AC) connected to AC system 300 through a connection unit provided in each of leg circuits 8*u*, 8*v*, 8*w*, such as AC terminals Nu, Nv, Nw or the primary winding.

Leg circuit 8*u* is divided into a positive-side arm 13*u* from positive-side DC terminal Np to AC terminal Nu and a negative-side arm 14*u* from negative-side DC terminal Nn to AC terminal Nu. The connection point between positive-side arm 13*u* and negative-side arm 14*u* is connected to transformer 3 as AC terminal Nu. Positive-side DC terminal Np and negative-side DC terminal Nn are connected to DC system 4. Leg circuit 8v includes a positive-side arm 13v and a negative-side arm 14v, and leg circuit 8w includes a positive-side arm 13w and a negative-side arm 14w. Hereinafter, leg circuit 8u will be described below as a representative because leg circuits 8v, 8w have the same configuration as leg circuit 8u.

In leg circuit 8u, positive-side arm 13u includes a plurality of converter cells 1 connected in cascade and a reactor 7a. The plurality of converter cells 1 and reactor 7a are connected in series with each other. Negative-side arm 14u includes the plurality of converter cells 1 connected in cascade and reactor 7b. The plurality of converter cells 1 and reactor 7b are connected in series with each other.

The position where reactor 7a is inserted may be any position of positive-side arm 13u, and the position where reactor 7b is inserted may be any position of negative-side arm 14u. A plurality of reactors 7a and a plurality of reactors 7b may be provided. An inductance values of each reactor may be different from each other. Only reactor 7a of positive-side arm 13u or only reactor 7b of negative-side arm 14u may be provided.

Power conversion device 100 further includes an AC voltage detector 10, an AC current detector 15, DC voltage detectors 11a, 11b, and arm current detectors 9a, 9b provided in each leg circuit 8. These detectors measure an electric quantity (that is, current and voltage) used to control power conversion device 100. Signals detected by these detectors are input to control device 5.

Specifically, AC voltage detector 10 detects a u-phase AC voltage measured value Vacu, a v-phase AC voltage measured value Vacv, and a w-phase AC voltage measured value Vacw of AC system 300. AC current detector 15 is provided in each of the u-phase, the v-phase, and the w-phase of AC system 300, and detects a measured value of the AC current of each phase. DC voltage detector 11a detects a DC voltage measured value Vdcp of positive-side DC terminal Np connected to DC system 4. DC voltage detector 11b detects a DC voltage measured value Vdcn of negative-side DC terminal Nn connected to DC system 4.

Arm current detectors 9a, 9b provided in u-phase leg circuit 8u detect a positive-side arm current measured value Iup flowing through positive-side arm 13u and a negative-side arm current measured value Iun flowing through negative-side arm 14u. Arm current detectors 9a, 9b provided in v-phase leg circuit 8v detect a positive-side arm current measured value Ivp and a negative-side arm current measured value Ivn. Arm current detectors 9a, 9b provided in w-phase leg circuit 8w detect a positive-side arm current measured value Iwp and a negative-side arm current measured value Iwn. Here, in each of the positive-side arm current actually measured values Iup, Ivp, Iwp and the negative-side arm current actually measured values Iun, Ivn, Iwn, a current flowing in the direction from the positive-side DC terminal Np to the negative-side DC terminal Nn is positive.

Control device 5 outputs a gate control signal controlling the operation of each cell 1 based on the signal detected by each detector. For example, the gate control signal is a pulse width modulation (PWM) signal. In addition, control device 5 receives internal information from each cell 1. The internal information includes a voltage value of the capacitor of cell 1, state information indicating a state of cell 1, and the like.

<Configuration of Converter Cell>

Figure 4:
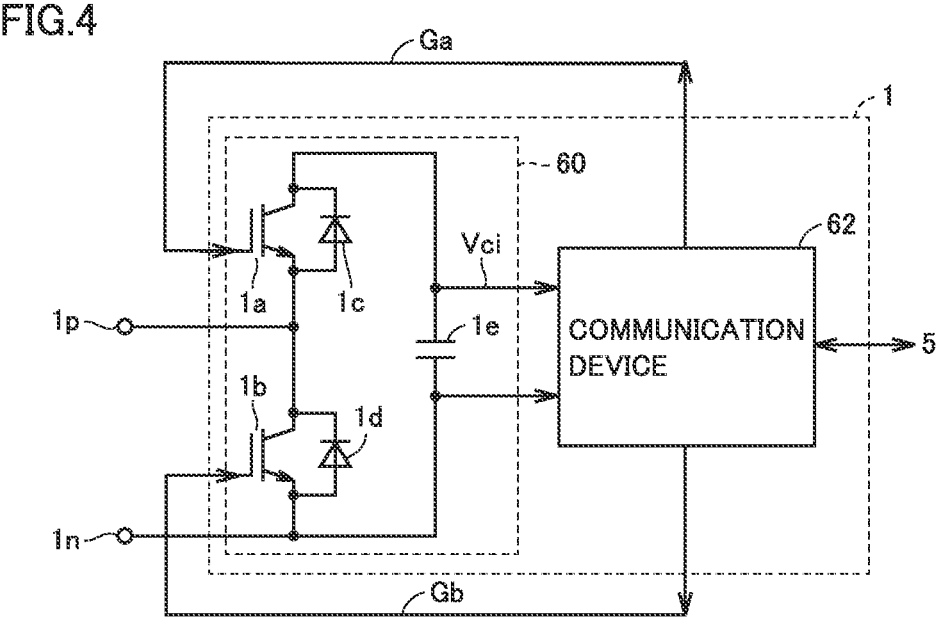
FIG. 4 is a block diagram illustrating a configuration example of a converter cell.

FIG. 4 is a block diagram illustrating a configuration example of converter cell 1. With reference to FIG. 4, converter cell 1 that is one example includes a cell main circuit 60 and a communication device 62. FIG. 4 illustrates a configuration of half-bridge type cell main circuit 60.

As illustrated in FIG. 4, cell main circuit 60 includes switching elements 1a, 1b connected in series with each other, diodes 1c, 1d, and a capacitor 1e as an energy storage device. Diodes 1c, 1d are connected in anti-parallel (that is, parallel and reverse bias direction) with switching elements 1a, 1b, respectively. Capacitor 1e is connected in parallel to the series connection circuit of switching elements 1a, 1b. A connection node of switching elements 1a, 1b is connected to positive-side input and output terminal 1p, and a connection node of switching element 1b and capacitor 1e is connected to negative-side input and output terminal 1n.

In cell main circuit 60, switching elements 1a, 1b are controlled such that one of switching elements 1a, 1b is turned on while the other is turned off. When switching element 1a is in the on-state while switching element 1b is in the off-state, the voltage between both ends of capacitor 1e is applied between input and output terminals 1p, 1n. In this case, input and output terminal 1p becomes a positive-side voltage, and input and output terminal 1n becomes a negative-side voltage. Conversely, when switching element 1a is in the off-state while switching element 1b is in the on-state, the voltage between input and output terminals 1p, 1n becomes zero volt. Thus, cell main circuit can output zero voltage or positive voltage by alternately turning on switching elements 1a, 1b. The magnitude of the positive voltage depends on the voltage of capacitor 1e. Diodes 1c, 1d are provided for protection when a reverse voltage is applied to switching elements 1a, 1b.

Communication device 62 communicates with a communication circuit provided in control device 5 to receive gate control signals Ga, Gb from control device Gate control signals Ga, Gb are output to the control electrodes of switching elements 1a, 1b, respectively. Thus, switching elements 1a, 1b are controlled so as to be turned on or off. Furthermore, communication device 62 transmits a capacitor voltage measured value Vci of the cell 1 to control device 5. As a communication system between communication device 62 and control device 5, it is desirable to use an optical communication system from the viewpoint of noise resistance.

A self-arc-extinguishing semiconductor switching element capable of controlling both on-operation and off-operation is used as each of switching elements 1a, 1b in FIG. 4. For example, an insulated gate bipolar transistor (IGBT), a gate commutated turn-off thyristor (GCT), or the like is used as switching elements 1a, 1b.

The configuration of converter cell 1 described above is an example, and converter cell 1 having another configuration may be applied to the first embodiment. For example, converter cell 1 may be configured using a full-bridge type conversion circuit, or configured using a conversion circuit called a 1.5 half-bridge configuration in which one switching element of the full-bridge type conversion circuit is replaced only with a diode.

<Hardware Configuration Example of Control Device>

Figure 5:
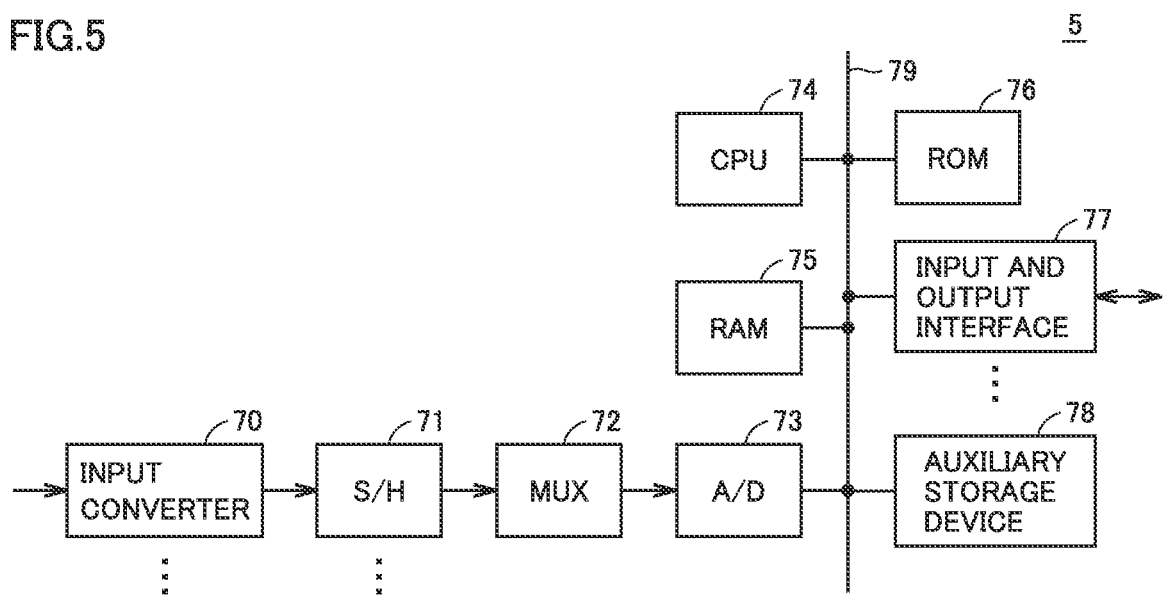
FIG. 5 is a block diagram illustrating an example of a hardware configuration of a control device.

FIG. 5 is a block diagram illustrating an example of a hardware configuration of control device 5. Control device 5 in the case of FIG. 5 is configured based on a computer. With reference to FIG. 5, control device 5 includes at least one input converter 70, at least one sample hold (S/H) circuit 71, a multiplexer (MUX) 72, and an A/D converter 73. Control device 5 further includes at least one central processing unit (CPU) 74, a random access memory (RAM) 75, and a read only memory (ROM) 76. Control device 5 further includes at least one input and output interface 77, an auxiliary storage device 78, and a bus 79 that interconnects the above-described components.

Input converter 70 includes an auxiliary transformer for each input channel. Each auxiliary transformer converts a detection signal by each electricity amount detector in FIG. 1 into a signal of a voltage level suitable for subsequent signal processing.

Sample hold circuit 71 is provided for each input converter 70. Sample hold circuit 71 samples and holds the signal representing the electric quantity received from corresponding input converter 70 at a specified sampling frequency.

Multiplexer 72 sequentially selects the signals held in the plurality of sample hold circuits 71. A/D converter 73 converts the signal selected by multiplexer 72 into a digital value. A/D conversion may be executed in parallel for detection signals of a plurality of input channels by providing a plurality of A/D converters 73.

CPU 74 controls entire control device 5 and executes arithmetic processing according to a program. RAM 75 that is a volatile memory and ROM 76 that is a nonvolatile memory are used as a main storage of CPU 74. ROM 76 stores programs, setting values for signal processing, and the like. Auxiliary storage device 78 is a nonvolatile memory having a larger capacity than ROM 76, and stores a program, data of an electric quantity detection value, and the like.

Input and output interface 77 is an interface circuit for the communication between CPU 74 and an external device. The communication system may be a wired communication system or a wireless communication system.

At least a part of control device 5 may be configured using a circuit such as a field programmable gate array (FPGA) and an application specific integrated circuit (ASIC). In addition, cell individual controller 61 for each converter cell can also be configured based on a computer as in the case of control device 5, or at least a part thereof can be configured using a circuit such as the FPGA and the ASIC. Alternatively, at least a part of control device 5 and at least a part of cell individual controller 61 can be configured by an analog circuit.

<Overall Configuration of Control Device>

Figure 6:
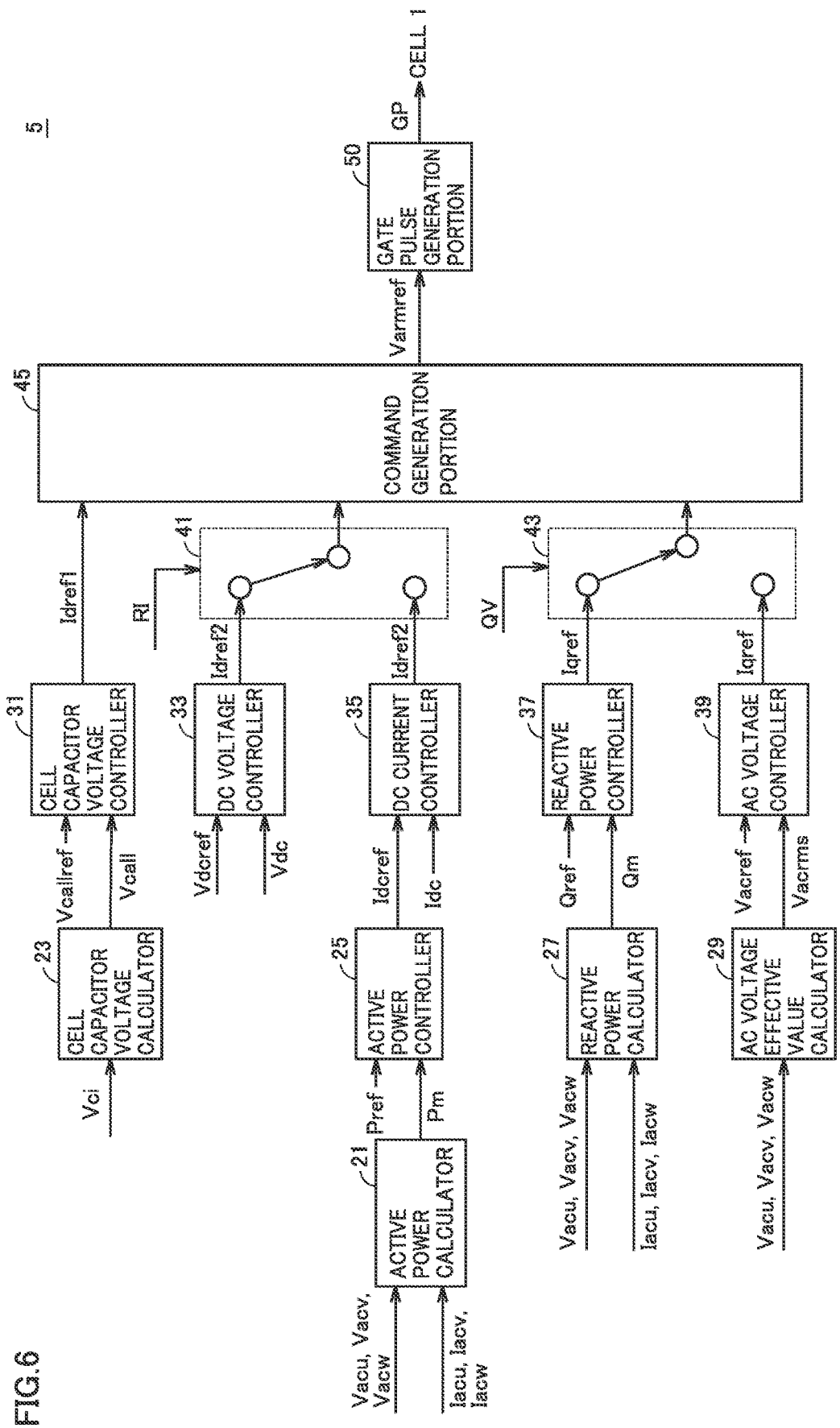
FIG. 6 is a block diagram illustrating an overall configuration of the control device.

FIG. 6 is a block diagram illustrating an overall configuration of control device 5. With reference to FIG. 6, control device 5 includes an active power calculator 21, a cell capacitor voltage calculator 23, an active power controller 25, a reactive power calculator 27, an AC voltage effective value calculator 29, a cell capacitor voltage controller 31, a DC voltage controller 33, a DC current controller 35, a reactive power controller 37, an AC voltage controller 39, selectors 41, 43, a command generation unit 45, and a gate pulse generation unit 50. For example, these configurations are realized by a circuitry. The circuitry may be dedicated hardware, or be CPU 74 that executes a program stored in the internal memory of control device 5. When the circuitry is the dedicated hardware, for example, the circuitry is configured of the FPGA, the ASIC, or a combination thereof.

Active power controller 25, cell capacitor voltage controller 31, DC voltage controller 33, DC current controller 35, reactive power controller 37, and AC voltage controller 39 can be configured as a PI controller, a PID controller, or another controller used for feedback control.

Cell capacitor voltage calculator 23 calculates a capacitor voltage value Vcall for all cells 1 based on capacitor voltage measured value Vci of each of all cells 1 (that is, all cells 1 included in self-excited converter 6). For example, capacitor voltage value Vcall is a voltage average value of all the capacitors (that is, all the capacitors included in self-excited converter 6). Capacitor voltage value Vcall may be a maximum value or a minimum value among capacitor measured voltages Vci of all cells 1, or a median of capacitor measured voltages Vci of all cells 1.

Cell capacitor voltage controller 31 calculates a deviation between a capacitor voltage command value Vcallref and a capacitor voltage value Vciall that are given for capacitor voltage value Vcall, and generates a first active current command value Idref1 in order to control the active current output from self-excited converter 6 such that the deviation becomes zero. Capacitor voltage command value Vcallref may be a fixed value or a variable value obtained by some arithmetic operation. For example, capacitor voltage command value Vcallref is provided by the external device (for example, a central control device or the like that manages the entire power system that is a host device of control device 5). Cell capacitor voltage controller 31 performs feedback control such that capacitor voltage value Vcall for all cells 1 becomes equal to capacitor voltage command value Vcallref.

DC voltage controller 33 calculates a deviation between given DC voltage command value Vdcref and DC voltage value Vdc, and generates a second active current command value Idref2 in order to control the active current output from self-excited converter 6 such that the deviation becomes zero. DC voltage value Vdc is a voltage value (that is, Vdc=Vdcp−Vdcn) obtained from DC voltage measured values Vdcp, Vdcn detected by DC voltage detectors 11*a*, 11*b*. DC voltage command value Vdcref may be a fixed value or a variable value obtained by some arithmetic operation. For example, DC voltage command value Vdcref is provided by the external device. DC voltage controller 33 performs feedback control such that DC voltage value Vdc becomes equal to DC voltage command value Vdcref.

Active power calculator 21 calculates an active power measured value Pm based on AC voltage measured values Vacu, Vacv, Vacw of the respective phases detected by AC voltage detector 10 and AC current measured values Iacu, Iacv, Iacw of the respective phases detected by AC current detector 15.

Active power controller 25 calculates a deviation between given active power command value Pref and active power measured value Pm, and generates a DC current command value Idcref in order to control the DC current output from self-excited converter 6 such that the deviation becomes zero. Active power command value Pref may be a fixed value or a variable value obtained by some arithmetic operation. For example, active power command value Pref is provided by the external device.

DC current controller 35 calculates a deviation between DC current command value Idcref and DC current value Idc, and generates a second active current command value Idref2 in order to control the active current output from self-excited converter 6 such that the deviation becomes zero. DC current value Idc is calculated as follows using each arm current measured value.

With reference to FIG. 3, AC current actual measurement value Iacu flowing from AC terminal Nu toward transformer 3 is a current value (that is, Iacu=Iup−Iun) obtained by subtracting negative-side arm current measured value Iun from positive-side arm current measured value Iup. This current is a leg current Icomu flowing through the DC terminal of leg circuit 8*u*. Consequently, "Icomu=(Iup+Iun)/2" holds. Similarly, "Icomv=(Ivp+Ivn)/2)" holds for to v-phase leg current Icomv, and "Icomw=(Iwp+Iwn)/2)" holds for a w-phase leg current Icomw. The positive-side DC terminals of leg circuits 8*u*, 8*v*, 8*w* of the respective phases are commonly connected as positive-side DC terminal Np, and the negative-side DC terminals are commonly connected as negative-side DC terminal Nn. From this configuration, the current value obtained by adding leg currents Icomu, Icomv, Icomw of the respective phases becomes DC current Idc that flows in from the positive-side terminal of DC system 4 and feeds back to DC system 4 through the negative-side terminal. Accordingly, "Idc=Icomu+Icomv+Icomw" holds.

With reference again to FIG. 6, reactive power calculator 27 calculates a reactive power actual measurement value Qm based on AC voltage actual measurement values Vacu, Vacv, Vacw of the respective phases and AC current actual measurement values Iacu, Iacv, Iacw of the respective phases.

Reactive power controller 37 calculates a deviation between given reactive power command value Qref and reactive power measured value Qm, and generates a reactive current command value Iqcref in order to control the reactive current output from self-excited converter 6 such that the deviation becomes zero. Reactive power command value Qref may be a fixed value or a variable value obtained by some arithmetic operation. For example, reactive power command value Qref is provided by the external device.

AC voltage effective value calculator 29 calculates an alternating-current voltage effective value Vacrms based on AC voltage measured values Vacu, Vacv, Vacw of the respective phases.

AC voltage controller 39 calculates a deviation between given AC voltage command value Vacref and AC voltage effective value Vacrms, and generates a reactive current command value Iqcref in order to control the reactive current output from self-excited converter 6 such that the deviation becomes zero. AC voltage command value Vacref may be a fixed value or a variable value obtained by some arithmetic operation. For example, AC voltage command value Vacref is provided by the external device.

Selector 41 selects second active current command value Idref2 generated by DC voltage controller 33 or second active current command value Idref2 generated by DC current controller 35 according to a signal RI, and outputs selected second active current command value Idref2.

Typically, when power conversion device 100 corresponding to control device 5 operates as the rectifier, signal RI is a signal selecting second active current command value Idref2 generated by DC voltage controller 33. On the other hand, when power conversion device 100 corresponding to control device 5 operates as the inverter, signal RI is a signal selecting second active current command value Idref2 generated by DC current controller 35. For example, signal RI is provided by the external device.

Selector 43 selects reactive a current command value Iqref generated by reactive power controller 37 or a reactive current command value Iqref generated by AC voltage controller 39 according to a signal QV, and outputs selected reactive current command value Iqref. For example, signal QV is provided by the external device.

Command generation unit 45 generates an arm voltage command value Varmref for the positive-side arm and the negative-side arm of each phase based on first active current command value Idref1, second active current command value Idref2, and reactive current command value Iqref.

Gate pulse generation unit 50 generates a gate control signal GP in order to control on and off of switching elements 1a, 1b provided in cell main circuit 60 based on arm voltage command value Varmref, and outputs gate control signal GP to each cell 1. Specifically, gate pulse generation unit 50 compares the arm voltage command value with the carrier signal, and generates a gate control signal GP as the PWM signal based on the comparison result. Gate control signal GP includes gate control signals Ga, Gb described above. For example, a triangular wave is used as the carrier signal.

<Function for Setting Control Parameter>

Generally, the control parameter of the power converter is determined by setting a simulated system that simulates the actual power system and performing simulation before starting operation. However, because a large number of adjustment elements exist, it is not efficient to check the setting in consideration of all conditions at the start of the operation whereby the analysis cost increases. In addition, when different manufacturers design each power converter, their design techniques become know-how of the manufacturer, so that the control parameter of each controller in the power converter are often not disclosed. Therefore, it may be difficult to incorporate appropriate control characteristics into the analysis and simulate the analysis before starting the operation.

In addition, as described above, due to the control interference by the controllers between the power converters such as the AC voltage controller of self-excited converter 6_1 and the DC current controller of separately-excited converter 120_2, the vibration may be regularly generated in the AC voltage of bus-line 95 when the operation pattern of AC system 300 is changed (for example, the change from the two-line operation to the one-line operation). Hereinafter, a system of setting the control parameter of self-excited converter 6_1 will be described in order to prevent the vibration of the AC voltage of bus-line 95.

When detecting the vibration component of the AC voltage of bus-line 95 at the time of changing the operation pattern of AC system 300 (for example, when the two-line operation is changed to the one-line operation), control device 5_1 of the first embodiment automatically adjusts the control parameter of self-excited converter 6_1 until the vibration component is prevented. When adjusting the control parameter to prevent the vibration component, control device 5_1 stores the operation pattern after the change (for example, the one-line operation), the vibration component generated after the operation pattern change, and the control parameter after the adjustment in which the vibration component can be prevented in the memory (for example, ROM 76, auxiliary storage device 78, and the like) in association with each other. Thus, when the vibration component under the same condition is generated (for example, when the similar vibration component is generated in the one-line operation), control device 5_1 sets the previously-adjusted control parameter stored in the memory as the control parameter of self-excited converter 6_1. Hereinafter, the control parameter setting function of control device 5_1 will be specifically described.

Figure 7:
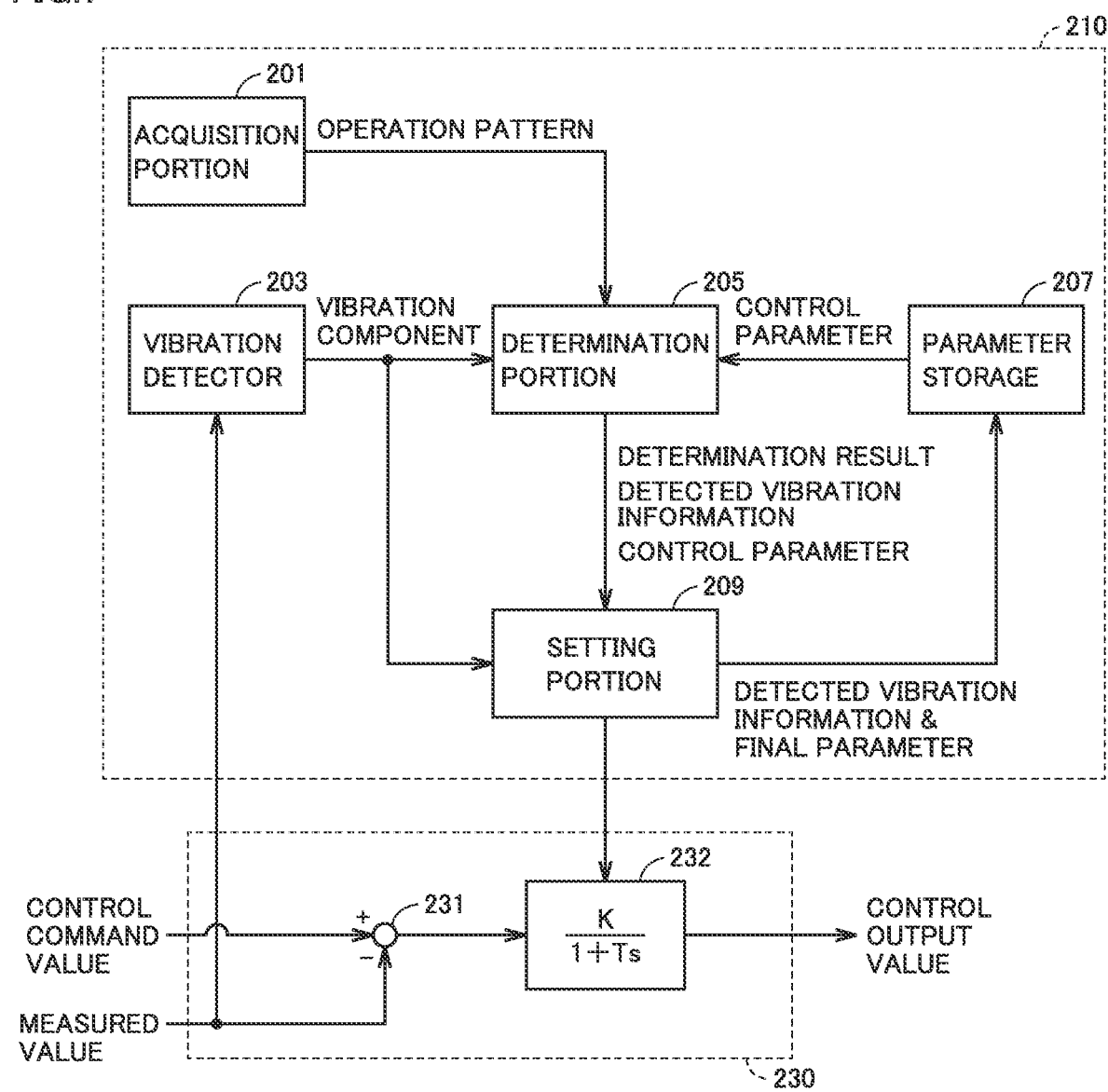
FIG. 7 is a functional block diagram related to a control parameter setting function of the control device.

FIG. 7 is a functional block diagram related to the control parameter setting function of control device 5_1. With reference to FIG. 7, a control parameter setting unit 210 of control device 5_1 includes an acquisition unit 201, a vibration detector 203, a determination unit 205, a parameter storage 207, and a setting unit 209. Typically, parameter storage 207 is implemented by ROM 76, auxiliary storage device 78, and the like. The functions of acquisition unit 201, vibration detector 203, determination unit 205, and setting unit 209 are implemented by the circuitry. The circuitry may be the dedicated hardware, or CPU 74 that executes the program stored in the internal memory of control device 5_1. When the circuitry is the dedicated hardware, for example, the circuitry is configured of the FPGA, the ASIC, or a combination thereof.

A feedback control unit 230 includes a subtractor 231 and a controller 232. Feedback control unit 230 has a function of controlling the AC voltage of bus-line 95. In this case, feedback control unit 230 (that is, subtractor 231 and controller 232) corresponds to AC voltage controller 39 in FIG. 6. The control command value corresponds to AC voltage command value Vacref (in this case, the AC voltage command value of bus-line 95), the measured value corresponds to AC voltage effective value Vacrms (in this case, the AC voltage effective value of bus-line 95), and the control output value corresponds to reactive current command value Iqref.

Parameter storage 207 stores the vibration information and the control parameter of self-excited converter 6_1 in association with each other for each of the plurality of pieces of vibration information. Specifically, parameter storage 207 stores an information table 500 in FIG. 8.

FIG. 8 is a view illustrating information table 500. With reference to FIG. 8, information table 500 includes each piece of vibration information and the control parameter (for example, gain K and time constant T) of controller 232 (in this case, AC voltage controller 39) associated with each piece of vibration information. The vibration information includes an operation pattern of AC system 300 and a vibration component included in the AC voltage (for example, the AC voltage of bus-line 95) of AC system 300 at the time of the operation pattern. The control parameter is a parameter preventing a vibration component included in the vibration information.

Typically, the vibration component is a vibration component of the AC voltage detected in the operation pattern of AC system 300. For example, focusing on the vibration information corresponding to No. 1, the vibration components (hereinafter, also referred to as a "vibration component D1" for convenience) of the AC voltage detected during the two-power transmission line operation of AC system 300 indicate that a fundamental wave voltage content is 99.0%, a second harmonic voltage content is 0.5%, and a third harmonic voltage content is 0.1%. In addition, the control parameter (for example, gain K and time constant T) in which vibration component D1 can be prevented is illustrated. In this case, gain K is "20" and time constant T is 0.5. Consequently, when the vibration component similar to the vibration component D1 is detected at the time of operating the two power transmission lines of AC system 300, it is considered that the detected vibration component can be prevented by setting gain K to 20 and setting time constant T to 0.5.

As another example, focusing on the vibration information corresponding to No. 2, the vibration components (hereinafter, also referred to as a "vibration component D2" for convenience) of the AC voltage detected when AC system 300 is operated (for example, only AC power transmission line 91_1 is used) with one-A-power transmission line operation indicate that the fundamental wave voltage content is the second harmonic voltage content is 2.0%, and the third harmonic voltage content is 1.1%. Gain K with which vibration component D2 can be prevented is "10", and time constant T is 0.5. A vibration information of No. 3 has the same operation pattern as that of the vibration information of No. 2, but has different vibration components.

The control parameter in information table 500 may be a value derived by simulation of a simulation system or the like. In this case, the vibration information (that is, the operation pattern and the vibration component) is given as the simulation condition.

The change in the operation pattern may be not only the change in the number of lines or a route of AC system 300, but also the change in the control mode (for example, an AC voltage constant control mode, a reactive power constant control mode, and the like) of self-excited converter 6, the change in the number of phase modifying facilities in response to a change of the active power command value of the separately-excited converter 120, and the like.

With reference again to FIG. 7, acquisition unit 201 acquires the current operation pattern of AC system 300 from the external device. Typically, acquisition unit 201 receives information indicating the current operation pattern through input and output interface 77. For example, the external device is a central control device that manages the entire power system. Acquisition unit 201 may periodically acquire the current operation pattern, or acquire the current operation pattern when the operation pattern is changed.

Vibration detector 203 detects the vibration component of the AC voltage (for example, the AC voltage of bus-line 95) of AC system 300. The vibration component can be represented by an index value such as a harmonic component content of the AC voltage, and a ratio (hereinafter, also referred to as a "harmonic amplitude ratio") of the effective value of the amplitude of the harmonic of a predetermined order to the effective value of the amplitude of the fundamental frequency of the AC voltage.

In one aspect, vibration detector 203 determines that the vibration component is detected when the harmonic component content of the AC voltage of AC system 300 is greater than or equal to a threshold Th1. Each order harmonic component content is a value indicating how much the harmonic component is included in the measured voltage waveform (in this case, the AC voltage of AC system 300). For example, the secondary harmonic component content is a value indicating how much the secondary harmonic component is included in the measured voltage waveform. Fast Fourier transform is performed on the AC voltage to perform power spectrum, thereby calculating the harmonic content of each order. Vibration detector 203 may determine that the vibration component is detected when the harmonic component content of a certain order is greater than or equal to threshold Th1, or determine that the vibration component is detected when the harmonic component content of a plurality of orders is greater than or equal to threshold Th1. The plurality of thresholds Th1 corresponding to the harmonic component contents of the plurality of orders may be different values.

In another aspect, vibration detector 203 determines that the vibration component is detected when the harmonic amplitude ratio of the AC voltage of AC system 300 is greater than or equal to a threshold Th2.

In still another aspect, vibration detector 203 may determine that the vibration component is detected when the state in which the harmonic component content of a certain order is greater than or equal to a threshold Th3 continues for a prescribed period, or determine that the vibration component is detected when the state in which the harmonic component content of the plurality of orders is greater than or equal to threshold Th3 continues for a prescribed period.

Vibration detector 203 may detect the vibration component using a plurality of index values. For example, vibration detector 203 may determine that the vibration component is detected when at least one of a first condition that the harmonic component content of the AC voltage of AC system 300 is greater than or equal to threshold Th1 and a second condition that the harmonic amplitude ratio of the AC voltage of AC system 300 is larger than or equal to threshold Th2 is satisfied.

Determination unit 205 determines whether similar vibration information similar to detected vibration information including the vibration component of the AC voltage of detected AC system 300 exists in the plurality of pieces of vibration information (for example, a plurality of pieces of vibration information included in information table 500) stored in the parameter storage 207. Specifically, the detected vibration information includes the operation pattern of AC system 300 acquired by acquisition unit 201 and the vibration component of the AC voltage of AC system 300 detected by vibration detector 203 in the operation pattern. It is said that the operation pattern included in the detected vibration information is the operation pattern of AC system 300 when the vibration component of the AC voltage is detected.

For example, when the operation pattern of the detected vibration information is matched with the operation pattern (that is, one-A-power transmission line operation) of vibration information X2 corresponding to No. 2 of information table 500, and when the vibration component of the detected vibration information is similar to the vibration component of vibration information X2, vibration information X2 is the similar vibration information similar to the detected vibration information. For example, when the difference between the index value of the vibration component of vibration information X2 and the index value of the vibration component of the detected vibration information is less than a certain value, it is determined that the vibration component of vibration information X2 is similar to the vibration component of the detected vibration information. The similar condition of the vibration component is arbitrarily determined by the operator, and may be other conditions.

When determining that similar vibration information exists in the plurality of pieces of vibration information stored in parameter storage 207, determination unit 205 extracts the control parameter associated with the similar vibration information. Determination unit 205 outputs the determination result that the similar vibration information exists, the detected vibration information, and the extracted control parameter to setting unit 209. On the other hand, when determining that the similar vibration information does not exist, determination unit 205 outputs the determination result indicating that the similar vibration information does not exist to setting unit 209.

When receiving the determination result that the similar vibration information exists, setting unit 209 sets the control parameter associated with the similar vibration information as a new control parameter of self-excited converter 6_1. For example, when the similar vibration information is vibration information X2, the control parameter (for example, K=10, T=0.5) associated with vibration information X2 is set as a new control parameter of controller 232. In the first embodiment, for ease of explanation, a configuration in which the control parameters are gain K and time constant T is described, but the present disclosure is not limited thereto. For example, the control parameters of controller 232 may include a plurality of time constants T1, T2, or include a gain KP of a proportional element, a gain KI of an integral element, and a gain KD of a differential element.

In addition, limiter values may be set for gains K, KP, KI, KD and time constants T1, T2. For example, a gain maximum value Kmax and a gain minimum value Kmin are set as the limiter value of gain K. Gain K is set within a range from gain minimum value Kmin to gain maximum value Kmax. The same applies to other gains KP, KI, KD and time constants T1, T2. The limiter value may be changed according to the operation pattern.

Subsequently, even after the control parameter associated with the similar vibration information is set as the new control parameter, when the vibration component of the AC voltage is detected by vibration detector 203 (that is, when the vibration component is not prevented), setting unit 209 changes the new control parameter according to a predetermined formula. Hereinafter, the control parameter associated with the similar vibration information set as the new control parameter is also referred to as a "control parameter SA" for convenience. In order to facilitate the description, a system of changing gain K as the control parameter will be described.

The newly calculated gain is defined as Knew1, the currently applied gain (in this case, the gain included in control parameter SA) is defined as Kold, and the gain minimum value is defined as Kmin. At this point, it is assumed that the vibration component of the AC voltage is detected when AC system 300 is switched from the two-power transmission line operation to the one-power transmission line operation. In the first embodiment, a method of preventing the vibration component by adjusting gain K of the AC voltage controller of self-excited converter 6_1 in the direction of decreasing gain K will be described based on knowledge obtained from offline simulation results and the like. First, setting unit 209 calculates gain Knew1 according to the following equation (1).

$$K\text{new}1 = K\text{old} - \{(K\text{old} - K\text{min})/2\} \tag{1}$$

Subsequently, setting unit 209 determines whether the difference between gain Kold and gain Knew1 is larger than a minimum step value Kdiv. Specifically, setting unit 209 determines whether the following expression (2) holds. Minimum step value Kdiv is set as a value determining whether to continue or end the control parameter change processing.

$$K\text{old} - K\text{new}1 > K\text{div} \tag{2}$$

When the difference between gain Knew1 and gain Kold is larger than minimum increment value Kdiv (that is, when the expression (2) is satisfied), setting unit 209 sets gain Knew1 as gain K of controller 232.

Subsequently, even after gain Knew1 is set, when the vibration component of the AC voltage is detected by vibration detector 203, it is considered that gain Knew1 is required to be further decreased. Accordingly, setting unit 209 calculates gain Knew2 according to the following equation (3).

$$K\text{new}2 = K\text{new}1 - \{(K\text{new}1 - K\text{min})/2\} \tag{3}$$

Setting unit 209 determines whether the difference between gain Knew1 and gain Knew2 is larger than minimum step value Kdiv. Specifically, setting unit 209 determines whether the following expression (4) holds.

$$K\text{new}1 - K\text{new}2 > K\text{div} \tag{4}$$

When the difference between gain Knew2 and gain Knew1 is larger than minimum increment value Kdiv (that is, when the expression (4) is satisfied), setting unit 209 sets gain Knew2 as gain K of controller 232.

On the other hand, when the vibration component of the AC voltage is not detected by vibration detector 203 after the setting of gain Knew1 (that is, when the vibration component is suppressed), there is a possibility that gain Knew1 is excessively decreased. Accordingly, setting unit 209 calculates gain Knew2 according to the following equation (5).

$$K\text{new}2 = K\text{old} - \{(K\text{old} - K\text{new}1)/2\} \quad (5)$$

Setting unit 209 determines whether the difference between gain Kold and gain Knew2 is larger than minimum step value Kdiv. Specifically, setting unit 209 determines whether the following expression (6) holds.

$$K\text{old} - K\text{new}2 > K\text{div} \quad (6)$$

When the difference between gain Knew2 and gain Knew1 is larger than minimum increment value Kdiv (that is, when the expression (4) is satisfied), setting unit 209 sets gain Knew2 as gain K of controller 232.

As described above, setting unit 209 repeats a series of processing illustrated in the expressions (1) to (6) until the difference between the gain before the change and the gain after the change becomes less than or equal to minimum increment value Kdiv. Then, setting unit 209 determines final gain K applied to controller 232, and sets gain K to controller 232.

When the vibration component of the AC voltage of AC system 300 is not detected by vibration detector 203 after the change of control parameter SA (for example, gain K), setting unit 209 sets changed control parameter SA as the final control parameter of controller 232. Setting unit 209 adds the detected vibration information to each piece of vibration information in information table 500, and stores the detected vibration information and changed control parameter SA in parameter storage 207 in association with each other. As a result, "operation pattern" and "vibration component" included in the detected vibration information and "control parameter" (that is, changed control parameter SA) associated with the detected vibration information are added to information table 500.

When the vibration component of the AC voltage of AC system 300 is detected by vibration detector 203 even when the series of processing illustrated in the expressions (1) to (6) is repeated, setting unit 209 performs the following processing. Specifically, when vibration detector 203 detects the vibration component of the AC voltage of AC system 300 after the change of control parameter SA (for example, gain K), setting unit 209 stores changed control parameter SA in parameter storage 207 in association with the detected vibration information as the control parameter that the vibration component in AC system 300 cannot be prevented.

When the similar vibration information does not exist, setting unit 209 changes the current control parameter of self-excited converter 6_1 according to the above expressions (1) to (6). Although the case where gain Kold is the gain included in control parameter SA has been described above, similar processing may be executed by replacing gain Kold with the gain included in the current control parameter.

The configuration in which gain K is adjusted in the decreasing direction has been described above. However, when the vibration component is prevented by changing self-excited converter 6_1 to the direction in which the response of the AC voltage control becomes faster, gain K is adjusted to the increasing direction.

In this case, when the gain maximum value is defined as Kmax, "Knew1=Kold+{(Kmax-Kold)/2}" is applied instead of Formula (1), and "Knew1-Kold>Kdiv" is applied instead of the expression (2).

When the vibration component of the AC voltage is detected by vibration detector 203 even after gain Knew1 is set, it is considered that gain Knew1 is required to be further increased. Accordingly, "Knew2=Knew1+{(Kmax-Knew1)/2}" is applied instead of the equation (3), and "Knew2-Knew1>Kdiv" is applied instead of the expression (4).

On the other hand, when the vibration component of the AC voltage is not detected by vibration detector 203 after the setting of gain Knew1, there is a possibility that gain Knew1 is excessively increased. Accordingly, "Knew2=Kold+{(Knew1-Kold)/2}" is applied instead of the equation (5), and "Knew2-Kold>Kdiv" is applied instead of the expression (6).

When it is not clear which direction the response of the AC voltage control of the self-excited converter 6_1 is changed to prevent the vibration component, gain K may be adjusted in the direction of decreasing gain K, and when the vibration component is not prevented, gain K may be adjusted in the direction of increasing gain K. Alternatively, the opposite may be applied. Furthermore, the increase or decrease of gain K may be determined by the magnitude of the harmonic component content of the AC voltage after the change of gain K.

<Processing Procedure for Setting Control Parameter>

Figure 9:
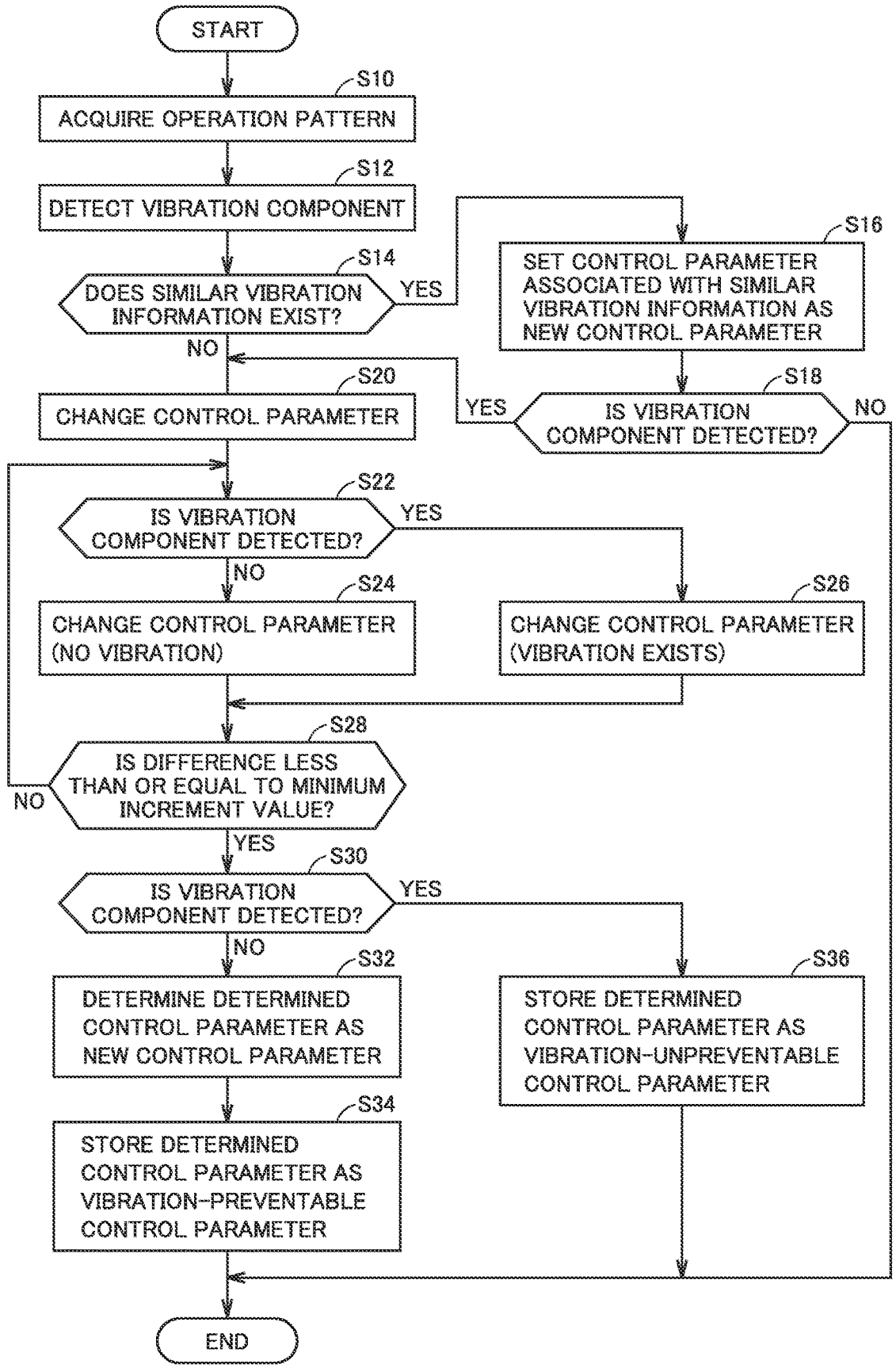
FIG. 9 is a flowchart illustrating a control parameter setting procedure.

FIG. 9 is a flowchart illustrating the control parameter setting procedure. Typically, each step in FIG. 9 is executed by CPU 74 of control device 5_1. Here, it is assumed that the operation pattern of AC system 300 is switched from the two-power transmission line operation to the one-power transmission line operation.

With reference to FIG. 9, control device 5_1 acquires the current operation pattern (that is, the one-power transmission line operation) of AC system 300 from the external device through input and output interface 77 (step S10). Control device 5_1 detects the vibration component of the AC voltage of AC system 300 (step S12). Control device 5_1 determines whether similar vibration information similar to the detected vibration information including the current operation pattern and the detected vibration component exists in the internal memory (for example, information table 500) (step S14).

When the similar vibration information exists (YES in step S14), control device 5_1 sets the control parameter associated with the similar vibration information as a new control parameter of self-excited converter 6_1 (step S16). After setting the new control parameter, control device 5_1 determines whether the vibration component of the AC voltage of AC system 300 is detected (step S18). When the vibration component is not detected (NO in step S18), control device 5_1 ends the processing. When the vibration component is detected (YES in step S18), control device 5_1 executes the processing of step S20.

When the similar vibration information does not exist (NO in step S14), control device 5_1 changes the current control parameter (step S20). When the similar vibration information does not exist (NO in step S14), the current control parameter is the control parameter used before the change of the operation pattern (that is, during the two-power transmission line operation). When the vibration component is detected (YES in step S18), the current control parameter is the control parameter newly set in step S16. For example, the control parameter change processing in step S20 is executed according to the above equation (1).

Subsequently, after the change of the control parameter, control device 5_1 determines whether the vibration component of the AC voltage of AC system 300 is detected (step S22). When the vibration component is not detected (NO in step S22), control device 5_1 changes (in this case, increases) the control parameter according to the equation (5) (step S24). When the vibration component is detected, control device 5_1 changes (in this case, decreases) the control parameter according to the equation (3) (step S26), and executes the processing of step S28.

Control device 5_1 determines whether the difference between the control parameter after the change and the control parameter before the change is less than or equal to minimum increment value Kdiv (step S28). When the difference is larger than minimum increment value Kdiv (NO in step S28), control device 5_1 proceeds to the processing of step S22. On the other hand, when the difference is less than or equal to minimum increment value Kdiv (YES in step S28), control device 5_1 sets the control parameters determined by the series of processing in steps S22 to S28 as the control parameters of self-excited converter 6_1, and then determines whether the vibration component of the AC voltage is detected (step S30).

When the vibration component is not detected (NO in step S30), control device 5_1 determines the determined control parameter as a new control parameter of self-excited converter 6_1 (step S32). Subsequently, control device 5_1 stores the determined control parameter in the internal memory as a vibration-preventable control parameter (step S34), and ends the processing. Specifically, control device 5_1 stores the detected vibration information and the determined control parameter in association with each other in information table 500.

On the other hand, when the vibration component is detected (YES in step S30), control device 5_1 stores the determined control parameter in the internal memory as a vibration-unpreventable control parameter (step S36), and ends the processing. Specifically, control device 5_1 stores the detected vibration information and the determined control parameter in association with each other in information table 500. In this case, control device 5_1 returns the control parameters of self-excited converter 6_1 to the original values (that is, the value of the control parameter used before the operation pattern is changed) and prevents the vibration by another technique. For example, a technique of changing from the AC voltage control to the reactive power control to prevent the vibration, a technique of requesting a correction request of the control parameter on the separately-excited converter side, and a technique of requesting the change of a power flow can be considered as another technique.

First Modification

The configuration in which feedback control unit 230 corresponds to AC voltage controller 39 and sets the control parameters of AC voltage controller 39 in order to prevent the vibration component of the AC voltage of AC system 300 has been described above. In a first modification, a configuration in which the control parameter of DC current controller 35 is set in order to prevent the vibration component of the DC current of DC system 4 will be described. The system of setting the control parameter of DC current controller 35 is basically similar to the system of setting the control parameter of AC voltage controller 39.

In the first modification, feedback control unit 230 in FIG. 7 (that is, controller 232 and subtractor 231) corresponds to DC current controller 35 in FIG. 6. The control command value corresponds to DC current command value Idcref, the measured value corresponds to DC current value Idc, and the control output value corresponds to second active current command value Idref2.

Parameter storage 207 stores the vibration information and the control parameters (here, control parameters of DC current controller 35) of self-excited converter 6_1 in association with each other for each of the plurality of pieces of vibration information about DC system 4. In order to distinguish from the vibration information about AC system 300, the vibration information about DC system 4 is also referred to as "DC system vibration information". Specifically, parameter storage 207 stores an information table for the DC current control like information table 500 for the AC voltage control.

The information table for the DC current control includes each DC system vibration information and the control parameter of controller 232 associated with each DC system vibration information. The DC system vibration information includes the operation pattern of DC system 4 and the vibration component included in the DC current of DC system 4 during the operation pattern. Typically, the vibration component is a vibration component of the DC current detected in the operation pattern of DC system 4. The control parameter is a parameter preventing the vibration component included in the DC system vibration information.

Acquisition unit 201 acquires the operation pattern of DC system 4 from the external device. For example, the operation pattern of DC system 4 includes one-DC power transmission line operation, two-DC power transmission line operation, and the like.

Vibration detector 203 detects the vibration component of the DC current of DC system 4. The vibration component is represented by an index value such as the effective value of the amplitude per certain period of the AC waveform superimposed on the DC current, and a fundamental wave component content (or harmonic component content) of the AC waveform.

Determination unit 205 determines whether the similar vibration information similar to the detected vibration information including the detected vibration component of the DC current of DC system 4 exists in the plurality of pieces of DC system vibration information stored in parameter storage 207. Specifically, the detected vibration information includes the operation pattern of DC system 4 acquired by acquisition unit 201 and the vibration component of the DC current of DC system 4 detected by vibration detector 203 in the operation pattern. It is said that the operation pattern included in the detected vibration information is the operation pattern of DC system 4 when the vibration component of the DC current is detected.

For example, when the operation pattern of the detected vibration information is matched with the operation pattern of DC system vibration information Y1, and when the vibration component of the detected vibration information is similar to the vibration component of DC system vibration information Y1, DC system vibration information Y1 is similar vibration information similar to the detected vibration information. When the difference between the index value of the vibration component of DC system vibration information Y1 and the index value of the vibration component of the detected vibration information is less than a certain value, the vibration component of DC system vibration information Y1 is similar to the vibration component of the detected vibration information.

When determination unit 205 determines that the similar vibration information exists, setting unit 209 sets the control parameter associated with the similar vibration information as the new control parameter of self-excited converter 6_1. Specifically, the control parameter of DC current controller 35 is newly set. The specific setting system of the control parameter is basically similar to that in the flowchart of FIG.

9. Specifically, in the flowchart of FIG. 9, "AC system 300" is replaced with "DC system 4", and "AC voltage" is replaced with "DC current".

Second Modification

In a second modification, a configuration in which the control parameter of cell capacitor voltage controller 31 in FIG. 6 is set in order to prevent the vibration component of capacitor voltage value Vcall during the change of the operation pattern of AC system 300 will be described. A system of setting the control parameter of cell capacitor voltage controller 31 is basically similar to the system of setting the control parameter of AC voltage controller 39.

In the second modification, feedback control unit 230 (that is, subtractor 231 and controller 232) in FIG. 7 corresponds to cell capacitor voltage controller 31 in FIG. 6. The control command value corresponds to capacitor voltage command value Vcallref, the measured value corresponds to capacitor voltage value Vcall, and the control output value corresponds to first active current command value Idref1.

Parameter storage 207 stores the vibration information and the control parameters (here, the control parameter of cell capacitor voltage controller 31) of self-excited converter 6_1 in association with each other for each of the plurality of pieces of vibration information. In order to distinguish from the vibration information of AC system 300, the vibration information about the capacitor voltage is also referred to as "capacitor vibration information". Specifically, parameter storage 207 stores an information table for capacitor voltage control like information table 500 for the AC voltage control.

The information table for capacitor voltage control includes each piece of capacitor vibration information and the control parameter of controller 232 associated with each piece of capacitor vibration information. The capacitor vibration information includes the operation pattern of AC system 300 and the vibration component included in capacitor voltage value Vcall in the operation pattern. Typically, the vibration component is the vibration component of capacitor voltage value Vcall detected in the operation pattern of AC system 300. The control parameter is the parameter preventing the vibration component included in the capacitor vibration information.

Acquisition unit 201 acquires the operation pattern of AC system 300 from the external device. Vibration detector 203 detects the vibration component of capacitor voltage value Vcall. The vibration component is represented by the index value such as the effective value of the amplitude per certain period of the AC waveform superimposed on capacitor voltage value Vcall, and the fundamental wave component content (or the harmonic component content) of the AC waveform.

Determination unit 205 determines whether the similar vibration information similar to the detected vibration information including the vibration component of detected capacitor voltage value Vcall exists in the plurality of pieces of capacitor vibration information stored in parameter storage 207. Specifically, the detected vibration information includes the operation pattern of AC system 300 acquired by acquisition unit 201 and the vibration component of capacitor voltage value Vcall detected by vibration detector 203 in the operation pattern. It is said that the operation pattern included in the detected vibration information is the operation pattern of AC system 300 when the vibration component of capacitor voltage value Vcall is detected.

For example, when the operation pattern of the detected vibration information is matched with the operation pattern of capacitor vibration information Z1, and when the vibration component of the detected vibration information is similar to the vibration component of capacitor vibration information Z1, capacitor vibration information Z1 is the similar vibration information similar to the detected vibration information. When the difference between the index value of the vibration component of capacitor vibration information Z1 and the index value of the vibration component of the detected vibration information is less than a certain value, the vibration component of capacitor vibration information Z1 is similar to the vibration component of the detected vibration information.

When determination unit 205 determines that the similar vibration information exists, setting unit 209 sets the control parameter associated with the similar vibration information as the new control parameter of self-excited converter 6_1. Specifically, the control parameter of cell capacitor voltage controller 31 is newly set. The specific setting system of the control parameter is basically similar to that in the flowchart of FIG. 9. In the flowchart of FIG. 9, "AC voltage" is read as "capacitor voltage value Vcall".

<Advantages>

According to the first embodiment, when self-excited DC power transmission system 400 and separately-excited DC power transmission system 450 are connected to AC system 300, the control parameter of self-excited converter 6_1 is automatically and appropriately set in order to prevent the vibration component of the AC voltage of bus-line 95 generated during the change of the operation pattern. In addition, because the worker does not need to set the control parameter, a work load of the worker can be reduced. Furthermore, the control parameter preventing the vibration component of the DC current of DC system 4 and the control parameter preventing the vibration component of the capacitor voltage value for all cells 1 are also appropriately and automatically set.

Second Embodiment

In the first embodiment described above, the configuration in which the control parameter is set according to the predetermined expression has been described. In a second embodiment, a configuration in which the control parameter is set using machine learning will be described. For example, control device 5 of the second embodiment is configured to perform reinforcement learning.

<Learning Phase>

Figure 10:
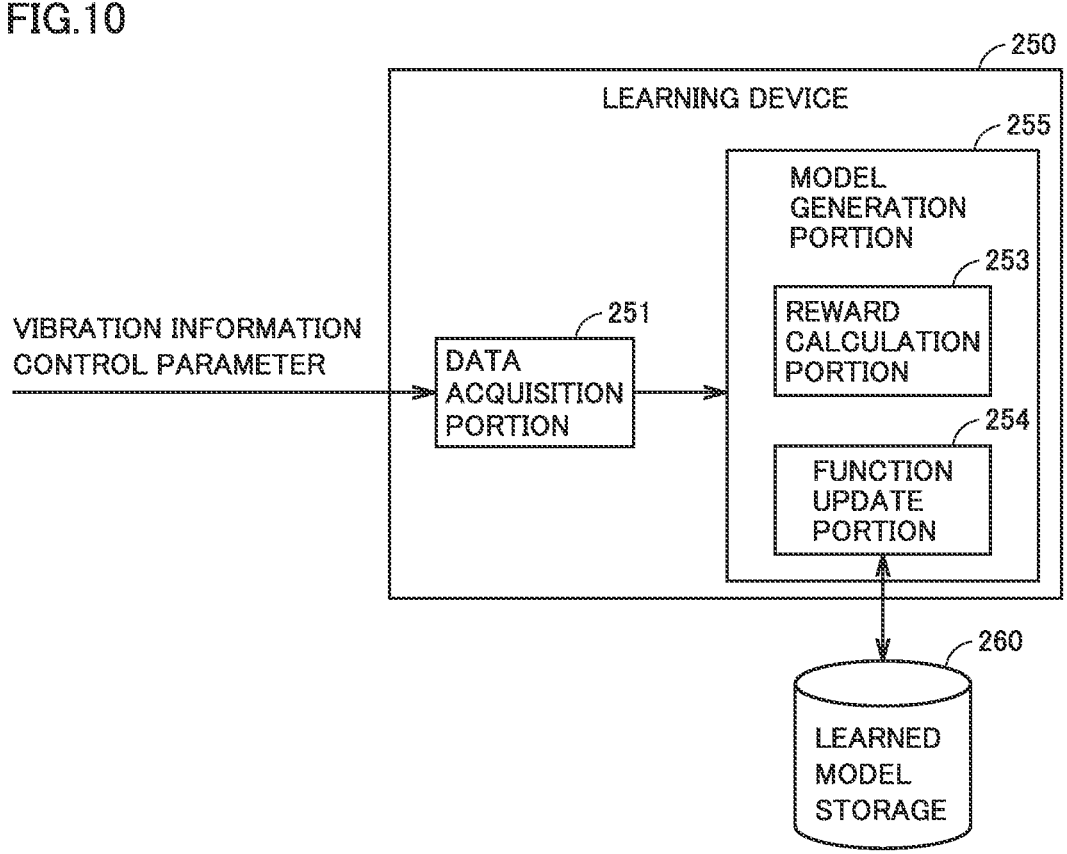
FIG. 10 is a configuration diagram illustrating a learning device related to a self-excited DC power transmission system.

FIG. 10 is a configuration diagram illustrating a learning device related to the self-excited DC power transmission system. A learning device 250 includes a data acquisition unit 251 and a model generation unit 255. In the second embodiment, a configuration in which learning device 250 is implemented by control device 5 (for example, it is incorporated) will be described.

The input parameter of learning device 250 is a state variable. In the second embodiment, the state variable includes vibration information (that is, the operation pattern and the vibration component) and the control parameter (for example, the control parameter of AC voltage controller 39) of self-excited converter 6_1. The output parameter of learning device 250 is an action value. The action value is the control parameter of self-excited converter 6_1 that maximizes a reward obtained in the future.

With reference to FIG. 10, data acquisition unit 251 acquires learning data including the vibration information and the control parameter of self-excited converter 6_1 associated with the vibration information. Specifically, the vibration information includes the operation pattern of AC system 300 and the vibration component included in the AC voltage of AC system 300 during the operation pattern. The control parameter of self-excited converter 6_1 is the control parameter of AC voltage controller 39. The learning data is acquired from information table 500 in FIG. 8. The vibration information and the control parameter that are set in the simulation may be acquired as the learning data.

Model generation unit 255 learns an optimal control parameter preventing the vibration component based on the learning data including the vibration information and the control parameter. That is, model generation unit 255 generates a learned model estimating the optimal control parameter from the vibration information using the learning data.

A known algorithm such as supervised learning, unsupervised learning, and the reinforcement learning can be used as learning algorithm used by model generation unit 255. The case where the reinforcement learning is applied will be described as an example. In the reinforcement learning, an agent (that is, action subject) in a certain environment observes the current state (that is, environmental parameter) and determines the action to be taken. The environment dynamically changes according to the action of the agent, and a reward is given to the agent according to the change in the environment. The agent repeats this, and learns an action policy that maximizes the reward through a series of actions. Q-learning, TD-learning, and the like are known as representative techniques of the reinforcement learning. For example, in the case of the Q-learning, a general update expression of an action-value function Q(s, a) is expressed by the following expression (7).

[Mathematical formula 1]

$$Q(s_t, a_t) \leftarrow Q(s_t, a_t) + \alpha\left(r_{t+1} + \gamma \max_a Q(s_{t+1}, a) - Q(s_t, a_t)\right) \quad (7)$$

In the expression (7), $s_t$ represents the environment at a time t, and $a_t$ represents the action at time t. Action at changes the environment to $s_{t+1}$. $r_{t+1}$ represents the reward given by the change in the environment, $\gamma$ represents a discount rate, and $\alpha$ represents a learning coefficient. $\gamma$ is in a range of $0<\gamma\leq1$, and $\alpha$ is in a range of $0<\alpha\leq1$. The output parameter of learning device 250 becomes action $a_t$, the vibration information becomes state $s_t$, and the best action $a_t$ in the state $s_t$ at the time t is learned.

The update expression represented by Equation (7) increases an action value Q when action value Q of action a having a Q value at time t+1 is larger than action value Q of the action a executed at time t, and the update expression decreases action value Q in the opposite case. In other words, action value function Q(s,a) is updated such that action value Q of action a at time t approaches the best action value at time t+1. As a result, the best action value in a certain environment is sequentially propagated to the action value in the previous environment.

As described above, when the learned model is generated by the reinforcement learning, model generation unit 255 includes a reward calculation unit 253 and a function update unit 254.

Reward calculation unit 253 calculates a reward r based on a reward criterion that defines how to increase or decrease the reward used for the learning of the learning model, the vibration information, and the control parameter. The reward criterion is set such that the reward is increased when the vibration component decreases (for example, when the harmonic component content of the AC voltage decreases), and such that the reward is decreased when the vibration component increases. Specifically, when the acquired control parameter is set in the state indicated by the acquired vibration information (that is, the operation pattern and the vibration component), reward calculation unit 253 increases the reward when the vibration component decreases (for example, the reward of "+1" is given), and decreases the reward when the vibration component increases (for example, the reward of "−1" is given).

Function update unit 254 updates a function determining the output parameter (that is, the control parameter) of learning device 250 according to the reward calculated by reward calculation unit 253, and outputs the function to a learned model storage 260. For example, in the case of the Q-learning, action value function $Q(s_t, a_t)$ represented by the expression (7) is used as the function obtaining the output parameter.

Learning device 250 repeatedly executes the above-described learning. Learned model storage 260 stores action value function $Q(s_t, a_t)$ updated by function update unit 254, namely, the learned model.

Figure 11:
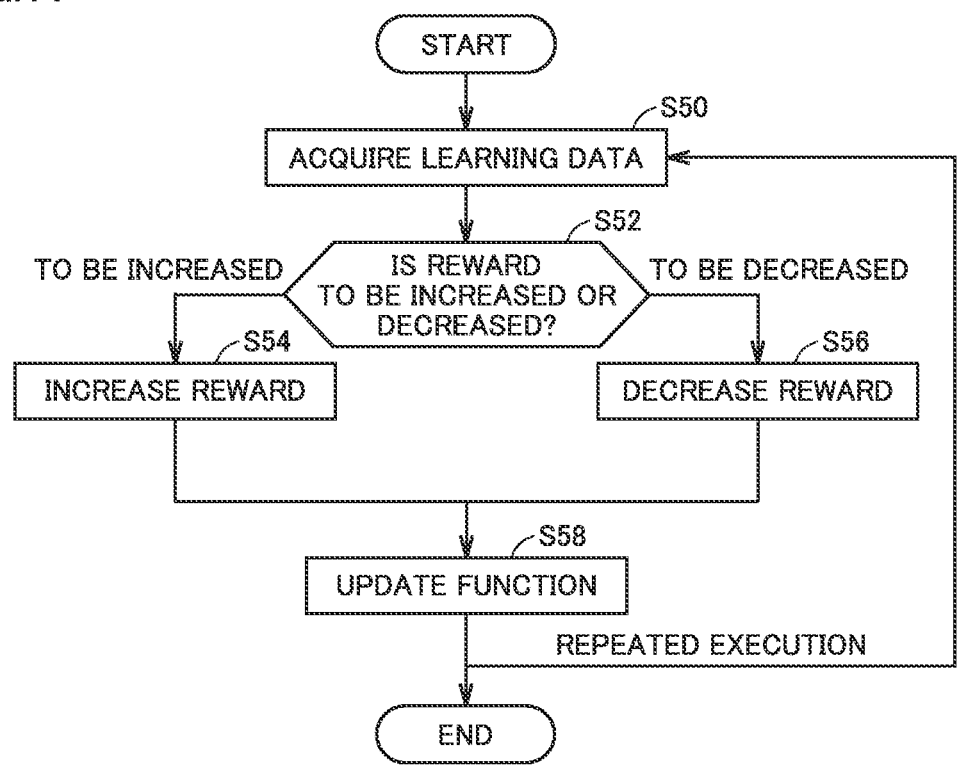
FIG. 11 is a flowchart illustrating processing for learning the learning device.

FIG. 11 is a flowchart illustrating processing for learning device 250. The steps in FIG. 11 are typically executed by CPU 74. With reference to FIG. 11, learning device 250 acquires the vibration information and the control parameter as learning data (step S50). Learning device 250 determines whether to increase or decrease the reward based on a reward standard, the vibration information, and the control parameter (step S52). Specifically, in the case where the acquired control parameter is set in the state indicated by the acquired vibration information (that is, the operation pattern and the vibration component), learning device 250 determines to increase the reward when the vibration component decreases, and determines to decrease the reward when the vibration component increases.

Learning device 250 increases the reward when the vibration component decreases (step S54). On the other hand, learning device 250 decreases the reward when the vibration component increases (step S56). Learning device 250 updates action-value function $Q(s_t, a_t)$ represented by the expression (7) stored in learned model storage 260 based on the calculated reward (step S58). Learning device 250 repeatedly executes steps S50 to S58 and stores generated action value function $Q(s_t, a_t)$ as the learned model.

Although learning device 250 stores the learned model in learned model storage 260 provided outside learning device 250, learned model storage 260 may be provided inside learning device 250.

<Utilization Phase>

Figure 12:
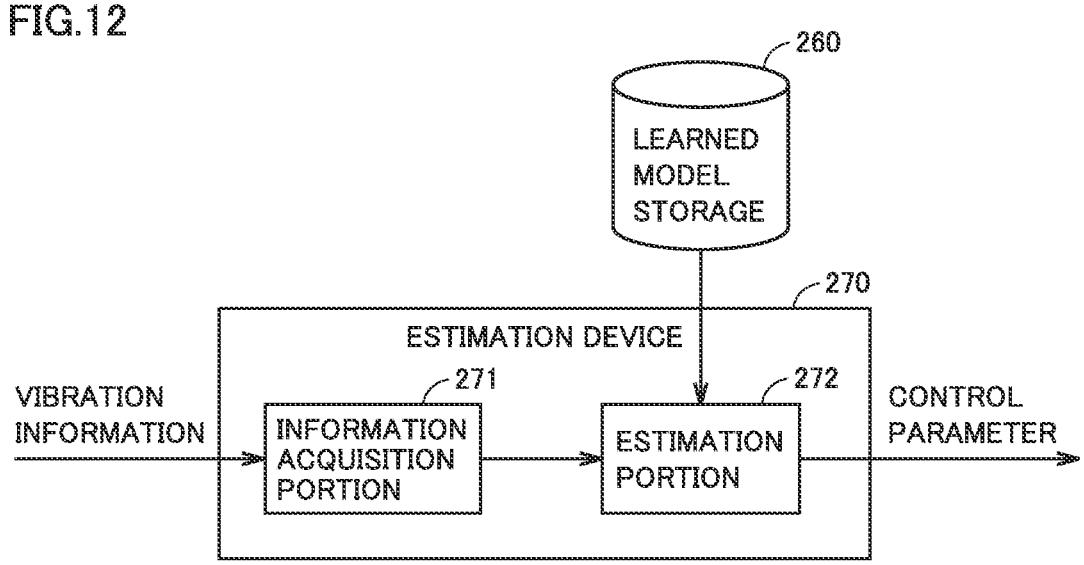
FIG. 12 is a configuration diagram illustrating an estimation device estimating a control parameter.

FIG. 12 is a configuration diagram illustrating an estimation device estimating the control parameter. With reference to FIG. 12, estimation device 270 estimates the control parameter of self-excited converter 6_1. Specifically, estimation device 270 includes an information acquisition unit 271 and an estimation unit 272. In the second embodiment, a configuration in which estimation device 270 is implemented by control device 5 (for example, it is incorporated) will be described.

Information acquisition unit 271 acquires the vibration information (that is, the operation pattern and the vibration component). Typically, the acquired vibration information includes the current operation pattern of AC system 300 and the vibration component of the AC voltage of AC system 300 during the operation pattern. Information acquisition unit 271 acquires the operation pattern from the external device through input and output interface 77. In addition, information acquisition unit 271 acquires the vibration component detected by vibration detector 203.

Estimation unit 272 estimates the control parameter (for example, the control parameter of AC voltage controller 39) of self-excited converter 6_1 using the learned model stored in learned model storage 260. Specifically, estimation unit 272 estimates the control parameter by inputting the vibration information acquired by information acquisition unit 271 to the learned model.

In the second embodiment, the configuration in which the control parameter is output using the learned model learned by model generation unit 255 of learning device 250 has been described. However, a configuration in which the learned model is acquired from another device and the control parameter is output using the learned model may be adopted.

Figure 13:
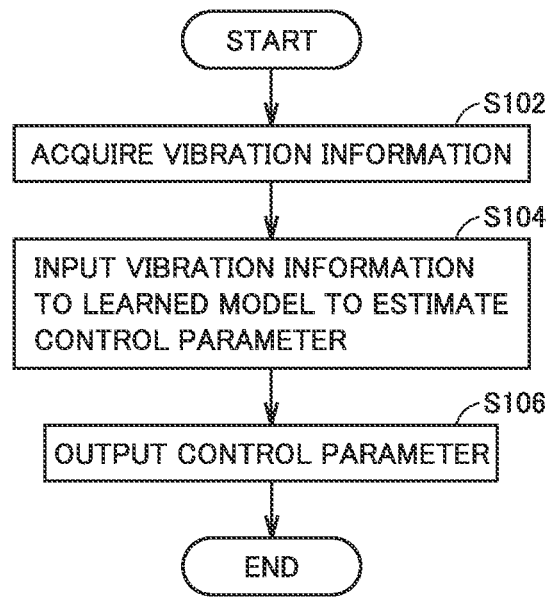
FIG. 13 is a flowchart illustrating a processing procedure of the estimation device.

FIG. 13 is a flowchart illustrating a processing procedure of the estimation device. The steps in FIG. 13 are typically executed by CPU 74. With reference to FIG. 13, estimation device 270 acquires vibration information (step S102). Estimation device 270 inputs the vibration information to the learned model stored in learned model storage 260, and estimates the control parameter of self-excited converter 6_1 (step S104). Estimation device 270 outputs the estimated control parameter to feedback control unit 230 (for example, AC voltage controller 39) in FIG. 7 (step S106). AC voltage controller 39 executes feedback control using the control parameter.

Modification

The configuration, in which the vibration information is the operation pattern of AC system 300 and the vibration component included in the AC voltage of AC system 300 and the estimated control parameter is the control parameter of AC voltage controller 39, has been described in the second embodiment described above. However, the present disclosure is not limited to this configuration. For example, as in the <first modification> of the first embodiment, the vibration information may be DC system vibration information (that is, the operation pattern of DC system 4 and the vibration component included in the DC current of DC system 4 during the operation pattern). The estimated control parameter may be the control parameter of DC current controller 35.

In this case, data acquisition unit 251 acquires the learning data including the DC system vibration information and the control parameter (for example, the control parameters of DC current controller 35). Using the learning data, model generation unit 255 generates the learned model in order to estimate the control parameter from the DC system vibration information. In addition, estimation unit 272 estimates the control parameter of DC current controller 35 by inputting the DC system vibration information acquired by information acquisition unit 271 to the learned model.

Similarly, as in the <second modification> of the first embodiment, the vibration information may be the capacitor vibration information (that is, the operation pattern of AC system 300 and the vibration component included in capacitor voltage value Vcall for all cells 1 during the operation pattern). The estimated control parameter may be the control parameter of cell capacitor voltage controller 31.

In this case, data acquisition unit 251 acquires the learning data including the capacitor vibration information and the control parameter (for example, the control parameter of cell capacitor voltage controller 31). Using the learning data, model generation unit 255 generates the learned model in order to estimate the control parameter from the capacitor vibration information. Estimation unit 272 inputs the capacitor vibration information acquired by information acquisition unit 271 to the learned model to estimate the control parameter of cell capacitor voltage controller 31.

<Advantages>

According to the second embodiment, the control parameter of self-excited converter 6_1 preventing the vibration component can be obtained using the machine learning.

Other Embodiments (1) In the above-described embodiments, the configuration in which the vibration information includes "operation pattern" and "vibration component" has been described. However, the present disclosure is not limited to this configuration. For example, the vibration information may include only "vibration component" and may not include "operation pattern".

(2) In the second embodiment, the case where the reinforcement learning is applied to the learning algorithm used by estimation unit 272 has been described. However, the present disclosure is not limited thereto. In addition to reinforcement learning, the supervised learning, the unsupervised learning, semi-supervised learning, or the like can be applied to the learning algorithm. As the learning algorithm used for the model generation unit 255, deep learning that learns extraction of the feature amount itself can be used, and the machine learning may be executed according to another known method such as a neural network, genetic programming, functional logic programming, and a support vector machine.

(3) In the second embodiment, the configuration in which learning device 250 and estimation device 270 are built in control device 5 has been described. However, the present disclosure is not limited to such the configuration. For example, learning device 250 and estimation device 270 may be connected to control device 5 through a network and may be devices separate from control device 5. Furthermore, learning device 250 and estimation device 270 may exist on a cloud server.

(4) The configurations exemplified as the above-described embodiments are an example of the configuration of the present disclosure, and can be combined with another known technique, or can be modified, for example, partially omitted without departing from the gist of the present disclosure. In addition, in the above-described embodiments, the processing and configuration described in other embodiments may be appropriately adopted and implemented.

It should be considered that the disclosed embodiment is an example in all respects and not restrictive. The scope of the present disclosure is defined by not the above description, but the claims, and it is intended that all modifications within the meaning and scope of the claims are included in the present disclosure.

REFERENCE SIGNS LIST

1: converter cell, 1a, 1b: switching element, 1c, 1d: diode, 1e: capacitor, 1n, 1p: input and output terminal, 3: transformer, 4, 122: DC system, 5, 125: control device, 6: self-excited converter, 7a, 7b: reactor, 8u, 8v, 8w: leg circuit, 9a, 9b: arm current detector, 10: AC voltage detector, 11a, 11b: DC voltage detector, 13u, 13v, 13w:

positive-side arm, 14u, 14v, 14w: negative-side arm, 15: AC current detector, 21: active power calculator, 23: cell capacitor voltage calculator, 25: active power controller, 27: reactive power calculator, 29: AC voltage effective value calculator, 31: cell capacitor voltage controller, 33: DC voltage controller, 35: DC current controller, 37: reactive power controller, 39: DC current controller, 41, 43: selector, 45: command generation unit, 50: gate pulse generation unit, 60: cell main circuit, 61: cell individual controller, 62: communication device, 70: input converter, 71: sample hold circuit, 72: multiplexer, 74: CPU, 75: RAM, 76: ROM, 77: input and output interface, 78: auxiliary storage device, 79: bus, 94, 95, 96, 97, 98, 99: bus-line, 100, 105: power conversion device, 110, 112, 113: generator, 120: separately-excited converter, 201: acquisition unit, 203: vibration detector, 205: determination unit, 207: parameter storage, 209: setting unit, 210: control parameter setting unit, 230: feedback control unit, 232: controller, 250: learning device, 251: data acquisition unit, 253: reward calculation unit, 254: function update unit, 255: model generation unit, 260: learned model storage, 270: estimation device, 271: information acquisition unit, 272: estimation unit, 300, 310, 320: DC system, 400: self-excited DC power transmission system, 450: separately-excited DC power transmission system, 500: information table

The invention claimed is:

1. A power conversion device included in a self-excited DC power transmission system connected to an AC system, the power conversion device comprising:
a self-excited converter to perform power conversion between the AC system and a DC system; and
a control device to control operation of the self-excited converter, wherein
the control device includes a storage to store first vibration information and a first control parameter of the self-excited converter in association with each other for each of a plurality of pieces of first vibration information,
the first vibration information includes a first vibration component included in an AC voltage of the AC system,
the first control parameter associated with the first vibration information is a parameter preventing the first vibration component, and
the control device includes
a vibration detector to detect a vibration component of an AC voltage of the AC system,
a determination unit to determine whether first similar vibration information similar to first detected vibration information including the vibration component of the AC voltage of the detected AC system exists in the plurality of pieces of first vibration information stored in the storage, and
a setting unit to set the first control parameter associated with the first similar vibration information as a new control parameter of the self-excited converter when the first similar vibration information exists,
wherein, when the vibration component is detected in the AC system by the vibration detector after the new control parameter is set, the setting unit changes the new control parameter according to a predetermined expression.

2. The power conversion device according to claim 1, wherein
the first vibration information further includes an operation pattern of the AC system,
the first vibration component is a vibration component included in the AC voltage of the AC system during the operation pattern of the AC system, and
the first detected vibration information further includes the operation pattern of the AC system at a time of detecting the vibration component of the AC voltage of the AC system.

3. The power conversion device according to claim 2, wherein, when the first similar vibration information does not exist, the setting unit changes a current control parameter of the self-excited converter according to the predetermined expression.

4. The power conversion device according to claim 2, wherein the detection of the vibration component of the AC voltage of the AC system includes at least one of a fact that a harmonic component content of the AC voltage of the AC system is greater than or equal to a first threshold and a fact that a ratio of an effective value of an amplitude of a harmonic to an effective value of an amplitude at a fundamental frequency of the AC voltage of the AC system is greater than or equal to a second threshold.

5. The power conversion device according to claim 1, wherein, when the vibration component of the AC voltage of the AC system is not detected by the vibration detector after the change of the new control parameter, the setting unit adds the first detected vibration information to the plurality of pieces of first vibration information, and stores the first detected vibration information and the new control parameter after the change in the storage in association with each other.

6. The power conversion device according to claim 5, wherein the detection of the vibration component of the AC voltage of the AC system includes at least one of a fact that a harmonic component content of the AC voltage of the AC system is greater than or equal to a first threshold and a fact that a ratio of an effective value of an amplitude of a harmonic to an effective value of an amplitude at a fundamental frequency of the AC voltage of the AC system is greater than or equal to a second threshold.

7. The power conversion device according to claim 1, wherein, when the vibration component is detected in the AC system by the vibration detector after the change of the new control parameter, the setting unit stores the new control parameter after the change in the storage in association with the first detected vibration information as the control parameter in which the vibration component in the AC system cannot be prevented.

8. The power conversion device according to claim 7, wherein the detection of the vibration component of the AC voltage of the AC system includes at least one of a fact that a harmonic component content of the AC voltage of the AC system is greater than or equal to a first threshold and a fact that a ratio of an effective value of an amplitude of a harmonic to an effective value of an amplitude at a fundamental frequency of the AC voltage of the AC system is greater than or equal to a second threshold.

9. The power conversion device according to claim 1, wherein, when the first similar vibration information does not exist, the setting unit changes a current control parameter of the self-excited converter according to the predetermined expression.

10. The power conversion device according to claim 1, wherein the detection of the vibration component of the AC voltage of the AC system includes at least one of a fact that a harmonic component content of the AC voltage of the AC system is greater than or equal to a first threshold and a fact that a ratio of an effective value of an amplitude of a harmonic to an effective value of an amplitude at a fundamental frequency of the AC voltage of the AC system is greater than or equal to a second threshold.

11. A power conversion device included in a self-excited DC power transmission system connected to an AC system, the power conversion device comprising:
   a self-excited converter to perform power conversion between the AC system and a DC system; and
   a control device to control operation of the self-excited converter, wherein
   the control device includes a storage to store first vibration information and a first control parameter of the self-excited converter in association with each other for each of a plurality of pieces of first vibration information,
   the first vibration information includes a first vibration component included in an AC voltage of the AC system,
   the first control parameter associated with the first vibration information is a parameter preventing the first vibration component, and
   the control device includes
   a vibration detector to detect a vibration component of an AC voltage of the AC system,
   a determination unit to determine whether first similar vibration information similar to first detected vibration information including the vibration component of the AC voltage of the detected AC system exists in the plurality of pieces of first vibration information stored in the storage,
   a setting unit to set the first control parameter associated with the first similar vibration information as a new control parameter of the self-excited converter when the first similar vibration information exists, wherein
   the vibration detector further detects a vibration component of a DC current of the DC system,
   the storage further stores a second vibration information and a second control parameter of the self-excited converter in association with each other for each of a plurality of pieces of second vibration information,
   the second vibration information includes a second vibration component included in the DC current of the DC system,
   the second control parameter associated with the second vibration information is a parameter preventing the second vibration component,
   the determination unit further determines whether second similar vibration information similar to second detected vibration information including the vibration component of the DC current of the DC system exists in the plurality of pieces of second vibration information stored in the storage, and
   the setting unit sets the second control parameter associated with the second similar vibration information as a new second control parameter of the self-excited converter when the second similar vibration information exists.

12. The power conversion device according to claim 11, wherein
   the second vibration information further includes an operation pattern of the DC system,
   the second vibration component is a vibration component included in the DC current of the DC system during the operation pattern of the DC system, and
   the second detected vibration information further includes the operation pattern of the DC system at a time of detecting the vibration component of the DC current of the DC system.

13. The power conversion device according to claim 11, further comprising:
   a data acquisition unit to acquire first learning data including the first vibration information and the first control parameter; and
   a model generation unit to generate a first learned model estimating the first control parameter from the first vibration information using the first learning data.

14. The power conversion device according to claim 13, wherein
   the data acquisition unit further acquires second learning data including the second vibration information and the second control parameter, and
   the model generation unit further generates a second learned model estimating the second control parameter from the second vibration information using the second learning data.

15. The power conversion device according to claim 14, further comprising:
   an information acquisition unit to acquire the first vibration information; and
   an estimation unit to estimate the first control parameter by inputting the first vibration information acquired by the information acquisition unit to the first learned model.

16. The power conversion device according to claim 15, wherein
   the information acquisition unit further acquires the second vibration information, and
   the estimation unit estimates the second control parameter by inputting the second vibration information acquired by the information acquisition unit to the second learned model.

* * * * *